(12) United States Patent
Miyoshi

(10) Patent No.: US 7,252,296 B2
(45) Date of Patent: Aug. 7, 2007

(54) BAG WITH CASTER WHEELS

(75) Inventor: Etsuo Miyoshi, Higashikagawa (JP)

(73) Assignee: Swany Corporation, Kanagawa (JP)

( * ) Notice: Subject to any disclaimer, the term of this patent is extended or adjusted under 35 U.S.C. 154(b) by 189 days.

(21) Appl. No.: 11/194,553

(22) Filed: Aug. 2, 2005

(65) Prior Publication Data

US 2006/0027985 A1  Feb. 9, 2006

(30) Foreign Application Priority Data

Aug. 4, 2004 (JP) ............................ 2004-228653

(51) Int. Cl.
  *B62D 33/08* (2006.01)
  *B62B 3/00* (2006.01)
(52) U.S. Cl. ..................... 280/37; 280/655.1; 280/654; 280/47.34
(58) Field of Classification Search ................. 280/37, 280/655.1, 654, 47.34
  See application file for complete search history.

(56) References Cited

U.S. PATENT DOCUMENTS

| | | | |
|---|---|---|---|
| 3,998,476 A * | 12/1976 | Kazmark, Sr. .............. | 280/655 |
| 4,175,769 A * | 11/1979 | Kazmark .................... | 280/654 |
| 4,995,487 A | 2/1991 | Plath | |
| 5,024,458 A * | 6/1991 | Kazmark et al. ........... | 280/645 |
| 5,127,664 A * | 7/1992 | Cheng ......................... | 280/655 |
| 5,377,795 A | 1/1995 | Berman | |
| 5,664,652 A | 9/1997 | Shamah | |
| 5,762,168 A * | 6/1998 | Miyoshi ................... | 190/18 A |
| 5,908,093 A | 6/1999 | Miyoshi | |
| 5,950,779 A | 9/1999 | Miyoshi | |
| 6,024,376 A * | 2/2000 | Golichowski et al. ... | 280/655.1 |
| 6,505,720 B1 * | 1/2003 | Tsai ............................ | 190/115 |
| 6,964,420 B1 * | 11/2005 | Ghanizadeh et al. ... | 280/47.131 |
| 2003/0015383 A1 * | 1/2003 | Tsai ............................ | 190/115 |
| 2003/0038008 A1 * | 2/2003 | Han ............................ | 190/115 |

(Continued)

FOREIGN PATENT DOCUMENTS

EP  1 407 749  4/2004

(Continued)

*Primary Examiner*—Christopher P. Ellis
*Assistant Examiner*—John R. Olszewski
(74) *Attorney, Agent, or Firm*—Wenderoth, Lind & Ponack, L.L.P.

(57) ABSTRACT

A bag with caster wheels includes a base frame 1 having caster wheels 6 and a main bag 3. The base frame 1 includes a stand 2 mounting the main bag 3 thereon and telescopic rods 5 joined on one side of this stand 2 or between both sides. The stand 2 includes supporting cylinders 7 into which the telescopic rods 5 are inserted to be joined. The supporting cylinders 7 are arranged between the caster wheels 6 provided at four corners of the stand 2, and are projected in a lower surface of the stand 2, so that a projection height (d) thereof is made lower than a height (h) of the caster wheels 6. In lower surface projected parts 7A of the supporting cylinders 7, reinforcement walls 8 joined to the lower surface of the stand 2 are provided. The reinforcement walls 8 are arranged between the caster wheels 6 and in a posture oriented in a lateral direction of the stand 2. In this bag, the supporting cylinders 7 are joined to the stand 2 while being reinforced by the reinforcement walls 8, and lower ends of the telescopic rods 5 are joined to these supporting cylinders 7.

18 Claims, 17 Drawing Sheets

U.S. PATENT DOCUMENTS

2004/0238303 A1 * 12/2004 Hafif .................. 190/18 A

FOREIGN PATENT DOCUMENTS

| JP | 57-179824 | 11/1982 |
| JP | 63-131634 | 8/1988 |
| JP | 2-224613 | 9/1990 |
| JP | 10-117829 | 5/1998 |
| JP | 10-137022 | 5/1998 |

* cited by examiner

BAG WITH CASTER WHEELS

BACKGROUND OF THE INVENTION

1. Field of the Invention

The invention relates to a bag with caster wheels, and in particular to a bag having a vertically movable handle.

2. Description of the Related Art

Bags with caster wheels each having an extractive handle have been developed and widely used. Many types of the bags with this structure are each small enough to carry it on an airplane or a little larger than this. The bags with this structure are described in the specification of U.S. Pat. No. 4,995,487, Japanese Examined Patent Publication No. 4-76686, Japanese Unexamined Utility Model Publication No. 57-179824, and Japanese Unexamined Utility Model Publication No. 63-131634. The bags described in these publications are each provided with two caster wheels 41 on one side of a bottom surface as shown in FIG. 1. On the opposite side of the caster wheels 41, short legs 42 are fixed. When the bag is in a vertically standing position, the caster wheels 41 and the legs 42 are in contact with a floor. In this state, since the legs 42 which do not rotate are in contact, the bag vertically stands on its own in an unmoved state. Furthermore, a handle 43 is provided in an extractable manner from an upper surface of the bag for pulling and moving the bag. Since the bag is pulled and moved in an inclined state, the handle 43 is provided on the same side as that of the caster wheels 41.

The bag with this structure can be moved in an inclined state by pulling the handle 43 as shown in FIG. 1. When the bag is inclined, the caster wheels 41 are brought into contact with the floor and the legs 42 leave the floor. In this state, pulling the handle 43 allows the caster wheels 41 to rotate, so that the bag can be moved with ease. However, in the bag moved in this manner, in some cases, the caster wheels 41 cannot be used in narrow or crowded places such as a flight cabin. This is because if the bag is moved with the caster wheels 41, a lateral width of the bag becomes larger, and thus, the bag cannot be moved freely in narrow aisles between seats in the cabin or in crowded places. When the caster wheels 41 cannot be used, the bag needs to be lifted with hands for moving. When lifted with hands for moving, the bag can be moved in a direction indicated by arrow A in FIG. 1 so as not to increase the lateral wide.

The structure of a bag with the caster wheels should be convenient for moving a heavy bag lightly and easily. This is because an even heavy bag can be moved easily with the caster wheels. Accordingly, in order to solve the above-described problem, the present inventor has developed a bag with a structure shown in FIG. 2 (Unexamined Patent Publication No. 10-117829). The bag in this figure has caster wheels 241 mounted on a bottom surface of a case body 244. The caster wheels 241 are provided at four corner regions of the bottom surface so that the case body 244 stands on its own in a vertical position. A gripping part 243A of a handle 243 is located above the case body 244 and at the center thereof, in a right-and-left direction. The bag with this structure is not inclined for moving as in the bag in FIG. 1. The bag is moved in a vertically standing position in a direction indicated by arrow in FIG. 2. Moving the bag in the direction indicated by arrow allows moving with a lateral width narrowed. Therefore, the bag has a feature that it can be moved conveniently in a flight cabin or in crowded places. Furthermore, if free swiveling castes wheels capable of moving in any direction are used as the four caster wheels 241, the bag can be moved in a vertical position in any direction. The bag in a vertical position does not apply any of its weight to the handle 243. Therefore, an even extremely heavy bag can be easily moved simply by pushing.

The bag with this structure can be moved lightly and easily with the four caster wheels by pushing the gripping part of the handle. However, since this bag with this structure has the handle mounted at the center, telescopic rods 245 of the handle 243 need to be fixed inside of the case body 244, as shown in a sectional view of FIG. 3. The telescopic rods 245 has the gripping part 243A disposed at the center of the case body 244 in the right-and-left direction, and thus, are fixed in a state in which they penetrate the center of the case body 244 in the right-and-left direction, that is, the center in a thickness direction. In the bag with this structure, the telescopic rods 245 are disturbing, and make it difficult to effectively use the inside of the case body 244.

The present inventor has developed a bag depicted in FIG. 4 for the purpose of solving the above-described problem or the like (refer to Japanese Unexamined Patent Publication No. 10-137022).

This bag is provided with caster wheels 441 at four corner regions on a bottom surface of a case body 444, and further telescopic rods 445 are fixed on a side surface of this case body 444. The telescopic rods 445 are structured so that a handle 443 can be extracted upward, and a gripping part 443A is provided at upper ends of the telescopic rods 445. The telescopic rods 445 are curved so that the gripping part 443A is located at the center of an upper surface of the case body 444 in the right-and-left direction with the telescopic rods 445 pulled up from the case body 444.

SUMMARY OF THE INVENTION

The bag with this structure has a feature that the inside of the main bag can be made deeper because the telescopic rods are fixed to the side. However, in the bag with this structure, since the telescopic rods are fixed to the main bag, the main bag needs to have a robust structure. This is because the telescopic rods need to stand on their own with the main bag. The bag with this structure is not moved by pulling the telescopic rods as shown in FIG. 1, but the main bag is moved by pushing forward while being used as a stick for a support of a walker, and thus, a robust structure in which even pushing does not allow the bag to fall is required. Accordingly, in order to achieve a structure in which the telescopic rods can stand on their own with the main bag, attaching parts between the main bag and the telescopic rods need to be reinforced robustly. This disadvantageously makes the structure of the main bag complex and remarkably increases manufacturing costs. Also, the main bag has a problem that it is difficult to reinforce it so as to have a robust structure without reducing storage space.

The present inventor has further developed a bag shown in FIG. 5 in order to solve this problem. In this bag, a main bag 53 is detachably mounted on a base frame 51 provided with caster wheels 56 which are free to swivel in any direction at four corner regions of a bottom surface. The base frame 51 has a stand 52 on which the main bag 53 is mounted, telescopic rods 55 which can be freely extended upward and have a grip 54 at upper ends thereof, and stoppers (not shown) for stopping the telescopic rods 55 at an extension position and a retraction position. The stand 52 is provided with the caster wheels 56 at four corner regions. The telescopic rods 55 are fixed on one side of the stand 52 so as to elongate upward and stand on their own. The main bag 53 is mounted on the stand 52 and on side surfaces of the telescopic rods 55, and is joined to the base frame 51.

In the bag with this structure, unlike the prior art bags, the telescopic rods 55 cannot be prevented from falling by the main bag 53. Therefore, the base frame 51 needs to securely join the telescopic rods 55 to the stand 52 with an enough robust structure to prevent the telescopic rods 55 from failing. In order to realize it, in the base frame 51, the telescopic rods 55 are fixed at corner regions of the stand 52 and the telescopic rods 55 are reinforced by reinforcement walls 58. The reinforcement walls 58 are provided along both end edges of the stand 52 and join the telescopic rods 55 and the stand 52, so that the telescopic rods 55 are joined to the stand 52 without falling. This base frame 51 has the main bag 53 mounted in a part surrounded by the telescopic rods 55 and the reinforcement walls 58. The stand 52 and the reinforcement walls 58 are integrally formed from plastic to be manufactured.

In the bag with this structure, the main bag is joined to the stand with the reinforcement walls preventing the telescopic rods from falling. However, since the reinforcement walls are provided along both of the end edges of the stand, the main bag needs to be mounted between the reinforcement walls at both of the end edges. This causes a distance between the pair of reinforcement walls to specify a width of the main bag, and if the width of the main bag is increased, the distance between the reinforcement walls needs to be increased, that is, the distance between the telescopic rods needs to be increased. Accordingly, when the reinforcement walls spaced widely are mounted on the base frame, the distance between the telescopic rods becomes larger, and thus, the grip becomes longer.

As the grip becomes longer, a weight of the whole bag is increased. Furthermore, a joining rod 57 joining the telescopic rods 55, or the like becomes longer, and thus the weight is further increased. The bag in which the telescopic rods 55 are provided at both of the end edges of the stand 52, as shown in FIG. 5, is suitable to a structure in which the main bag 53 is mounted on the stand 52 in a vertically standing position. However, in this structure, when the main bag 53 is mounted on the stand 52 in the vertical position, the distance between the telescopic rods becomes extremely large, and the grip 54 becomes very long.

This problem can be solved by joining a pair of telescopic rods 55 in the middle on one side of the stand. However, the telescopic rods joined in the middle of the stand cannot be provided with the reinforcement walls in a position oriented in a lateral direction of the stand, because the main bag is mounted where the reinforcement walls should be provided.

The invention has been further developed in order to solve the above-described problem. An important object of the invention is to provide a bag with caster wheels in which telescopic rods provided in the middle of a stand can be securely joined to the stand with a robust structure.

Another important object of the invention is to provide a bag with caster wheels in which a main bag has a simple structure and the bag can be mass-produced at low cost, and in addition, the telescopic rods stably stand on their own, so that the bag can be easily moved forward by gripping a grip part at the upper ends of the telescopic rods.

A bag with caster wheels includes a base frame 1 having caster wheels 6 which are free to swivel in any direction, at four corner regions of a bottom surface thereof; and a main bag 3 mounted on this base frame 1. The base frame 1 includes a stand 2 provided with the caster wheels 6 at the four corner regions thereof and mounting the main bag 3 thereon, telescopic rods 5 which are joined on one side of this stand 2 or between both sides in an upward-extending position so as to stand on their own and which can be freely extended upward and are provided with a grip 4 at upper ends thereof, and stoppers 15 for stopping the telescopic rods 5 at an extension position. The main bag 3 is joined to the telescopic rods 5 at a side surface thereof. The stand 2 is provided with supporting cylinders 7 into which the telescopic rods 5 are inserted to be joined. These supporting cylinders 7 are arranged between the caster wheels 6 provided at the four corners of the stand 2 and are projected in a lower surface of the stand 2 so that a projection height (d) is made lower than a height (h) of the caster wheels 6. Further, reinforcement walls 8 joined to the lower surface of the stand 2 are provided at power surface projection parts 7A of the supporting cylinders 7. The reinforcement walls 8 are provided in a position oriented in a lateral direction of the stand 2 between the caster wheels 6. In this bag, the reinforcement walls 8 are joined to the stand 2 while reinforcing the supporting cylinders 7, and lower ends of the telescopic rods 5 are joined to the supporting cylinders 7.

The above-described bag with caster wheels has a feature that the telescopic rods provided in the middle of the stand can be securely joined to the stand with a robust structure. This is because in the bag with caster wheels of the invention, the supporting cylinders into which the telescopic rods are inserted to be joined are provided in the stand, and these supporting cylinders are arranged between the caster wheels provided at the four corners of the stand and are projected in the lower surface of the stand, and further, the reinforcement walls in the position oriented in the lateral direction of the stand are provided in the lower surface projection parts of the supporting cylinders, so that the supporting cylinders are supported by these reinforcement walls. In this bag with this structure, since the supporting cylinders are projected in the lower surface of the stand and the reinforcement walls are joined to these projected parts to support the supporting cylinders instead of providing the reinforcement walls in the upper surface of the stand to join the supporting cylinders, the telescopic rods provided in the middle of the stand can be securely joined to the stand with the robust structure, while the main bag can be ideally arranged without limiting the upper surface of the stand. Also, the bag with this structure has features that it allows the telescopic rods to stably stand on their own and allows the user to move forward while holding the grip part on the upper ends of the telescopic rods, and additionally, that the main bag has a simple structure and thus, low-cost mass production can be achieved.

In a bag with caster wheels of the invention, the reinforcement walls 8 can include a longitudinal reinforcement wall 8B oriented in a longitudinal direction in addition to lateral reinforcements 8A oriented in the lateral direction of the stand 2, and the supporting cylinders 7 can be joined to the stand 2 with the lateral reinforcement walls 8A and the longitudinal reinforcement wall 8B.

In a bag with caster wheels of the invention, the telescopic rods 5 can be curved in a direction in which the grip 4 is moved from one side toward the center of the stand 2 when pulled up. Furthermore, in a bag with caster wheels of the invention, telescopic rods 75 can be inclined in a direction in which a grip 74 is moved from one side toward the center of a stand 72 when pulled up.

In a bag with caster wheels of the invention, a height from bottom surfaces of the caster wheels 6 to the grip 4 can be 60 to 100 cm with the telescopic rods 5 extended and stopped by the stoppers 15.

In a bag with caster wheels of the invention, the main bag 3 can be detachably mounted on the base frame 1.

In a bag with caster wheels of the invention, the telescopic rods can include guide cylinders 5B fixed to the stand 2 in a position in which the telescopic rods 5 can be oriented vertically, and extension rods 5A inserted into these guide cylinders 5B in an extractable manner, and the grip 4 can be fixed to upper ends of the extension rods 5A.

In a bag with caster wheels of the invention, the base frame 1 can be provided with the two supporting cylinders 7 on one side of the stand 2, the two telescopic rods 5 can be joined to the two supporting cylinders 7, and the grip 4 can be joined to upper ends of the two telescopic rods 5. Furthermore, in a bag with caster wheels of the invention, the longitudinal reinforcement 8B can be provided between the two supporting cylinders 7, and the two supporting cylinders 7 can be joined to the stand 2 with the longitudinal reinforcement 8B.

Furthermore, in a bag with caster wheels of the invention, upper ends of the guide cylinders 5B of the two telescopic rods 5 can be joined with a joining rod 11. In this bag, the joining rod 11 can be provided with joining pieces 13 projected upward in a surface opposed to the main bag 3, and the main bag 3 can be provided with insertion parts 3 into which the joining pieces 13 are inserted to be joined to the joining rod 11. In this bag, the joining pieces 13 are put into insertion parts 3B to loin the main bag 3 to the joining rod 11.

In a bag with caster wheels of the invention, the telescopic rods 5 can be provided with the joining pieces 13 projected upward in surfaces opposed to the main bag 3, and the main bag 3 can be provided with the insertion parts 3B into which the joining pieces 13 are inserted to be joined to the telescopic rods 5, and the joining pieces 13 can be put into the insertion parts 3B to join the main bag 3 to the telescopic rods 5.

Still furthermore, in a bag with caster wheels of the invention, the stand 2 and the reinforcement walls 8 can be integrally formed from plastic to construct the base frame 1.

The above and further objects and features of the invention will more fully be apparent from the following detailed description with accompanying drawings.

DETAILED DESCRIPTION OF THE PREFERRED EMBODIMENTS

Figure 1:
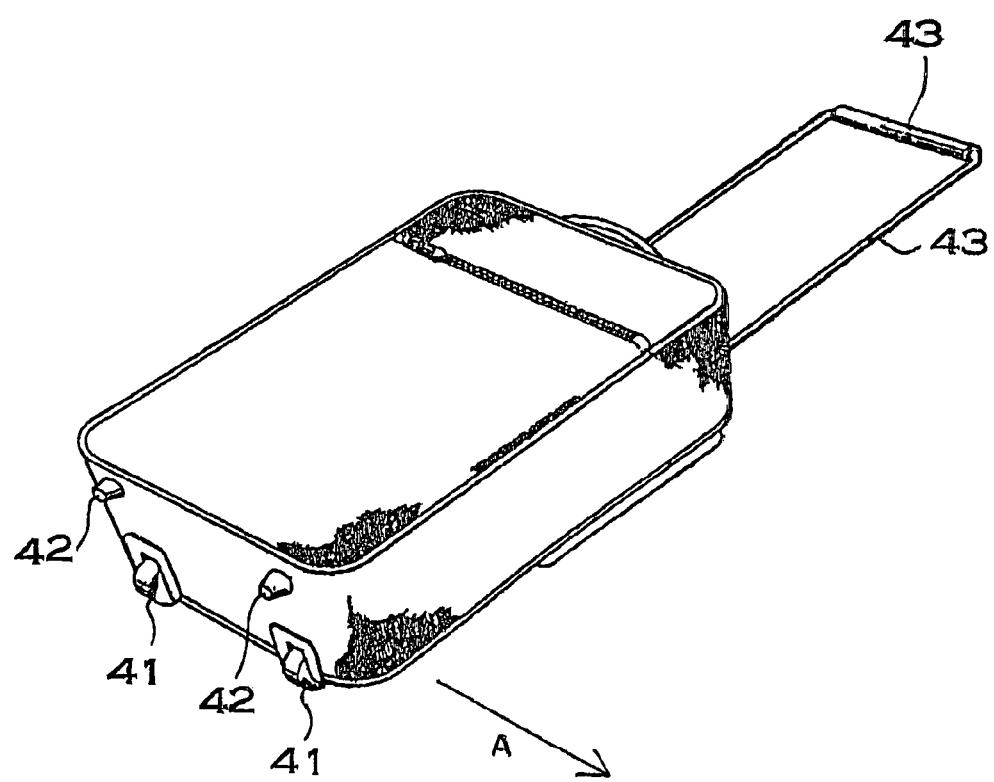
FIG. 1 is a perspective view showing a prior art bag with caster wheels.
Figure 2:
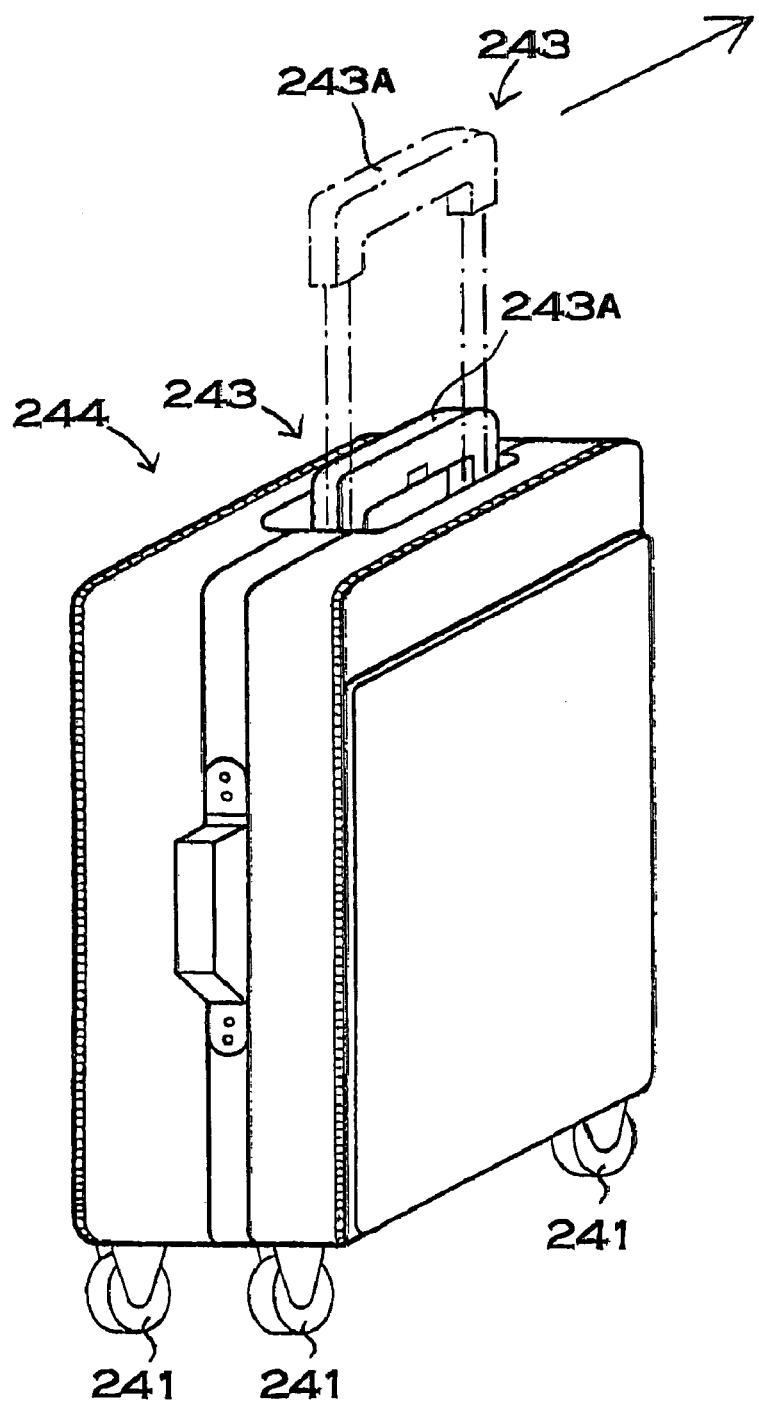
FIG. 2 is a perspective view showing a bag with caster wheels that the present inventor has previously developed.
Figure 3:
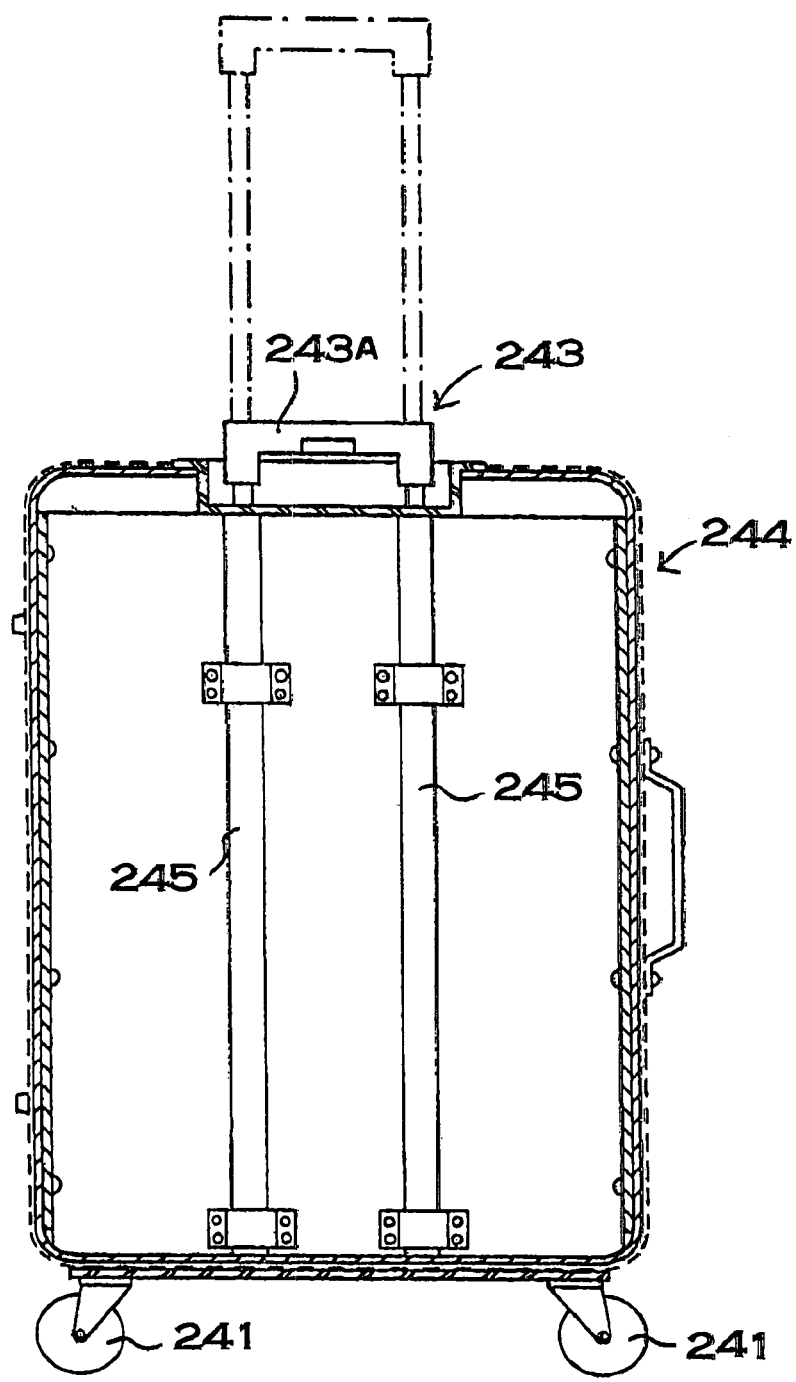
FIG. 3 is a vertical sectional view of the bag with caster wheels shown in FIG. 2.
Figure 4:
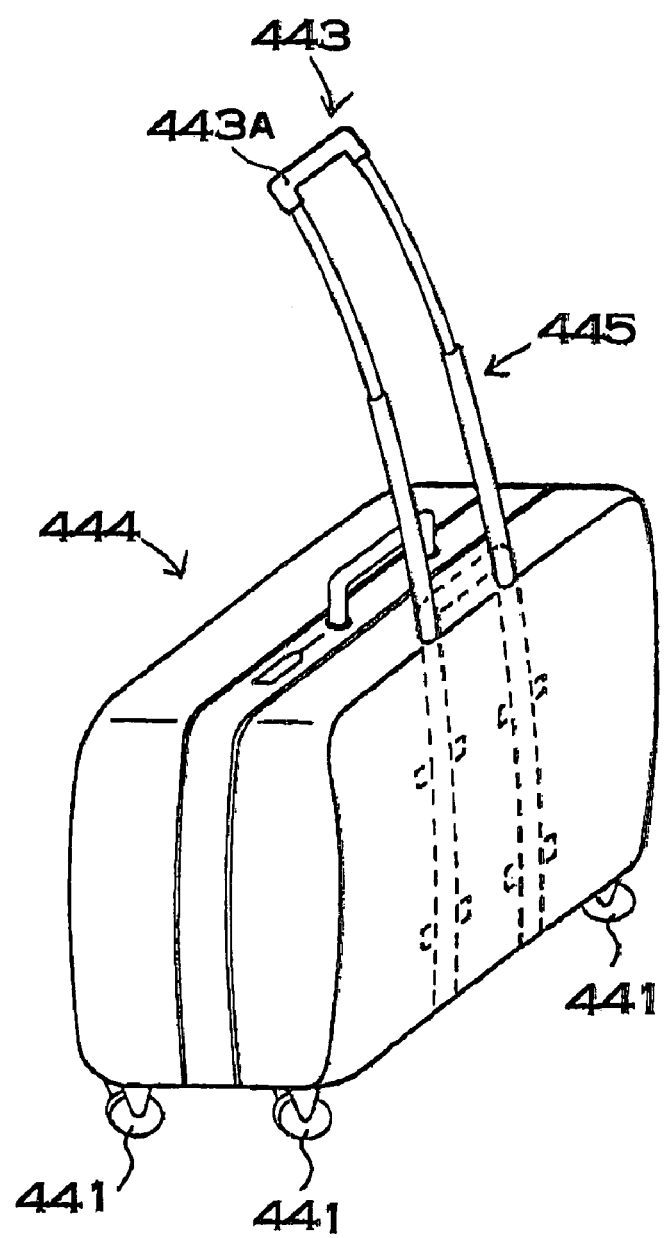
FIG. 4 is a perspective view of another bag with caster wheels that the present inventor has previously developed.
Figure 5:
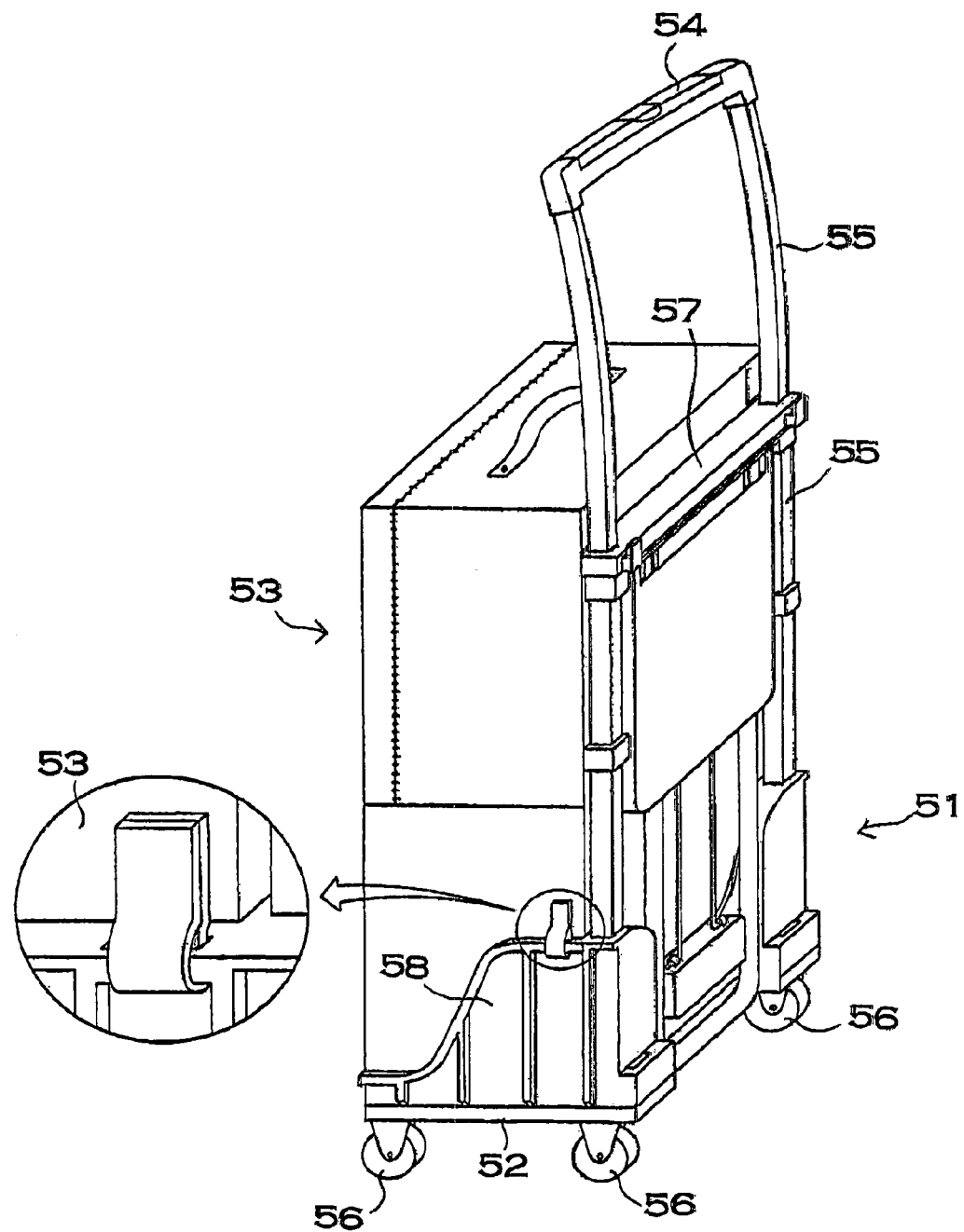
FIG. 5 is a perspective view of another bag with caster wheels that the present inventor has previously developed.
Figure 6:
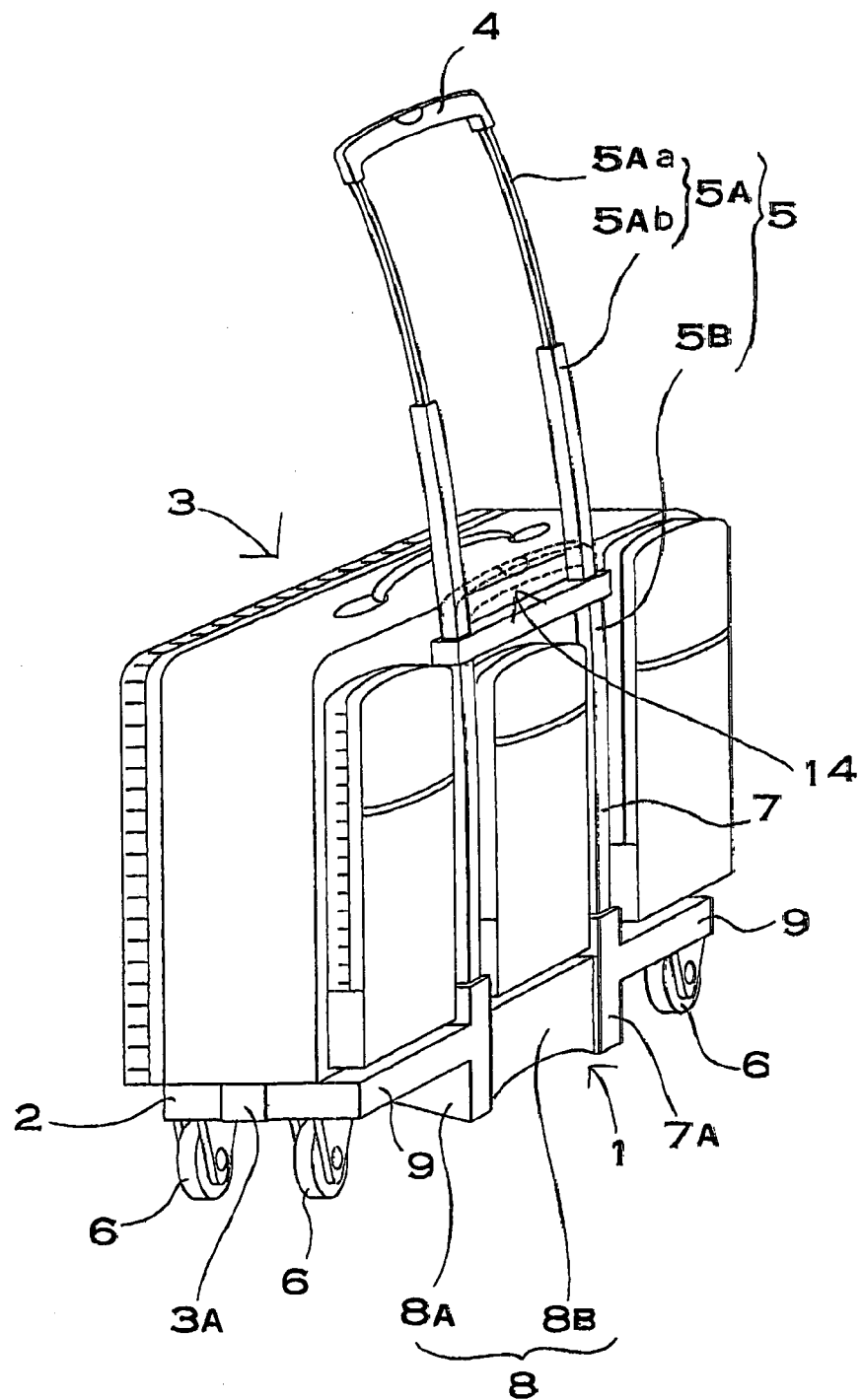
FIG. 6 is perspective view of a bag with caster wheels according to one embodiment of the invention.
Figure 7:
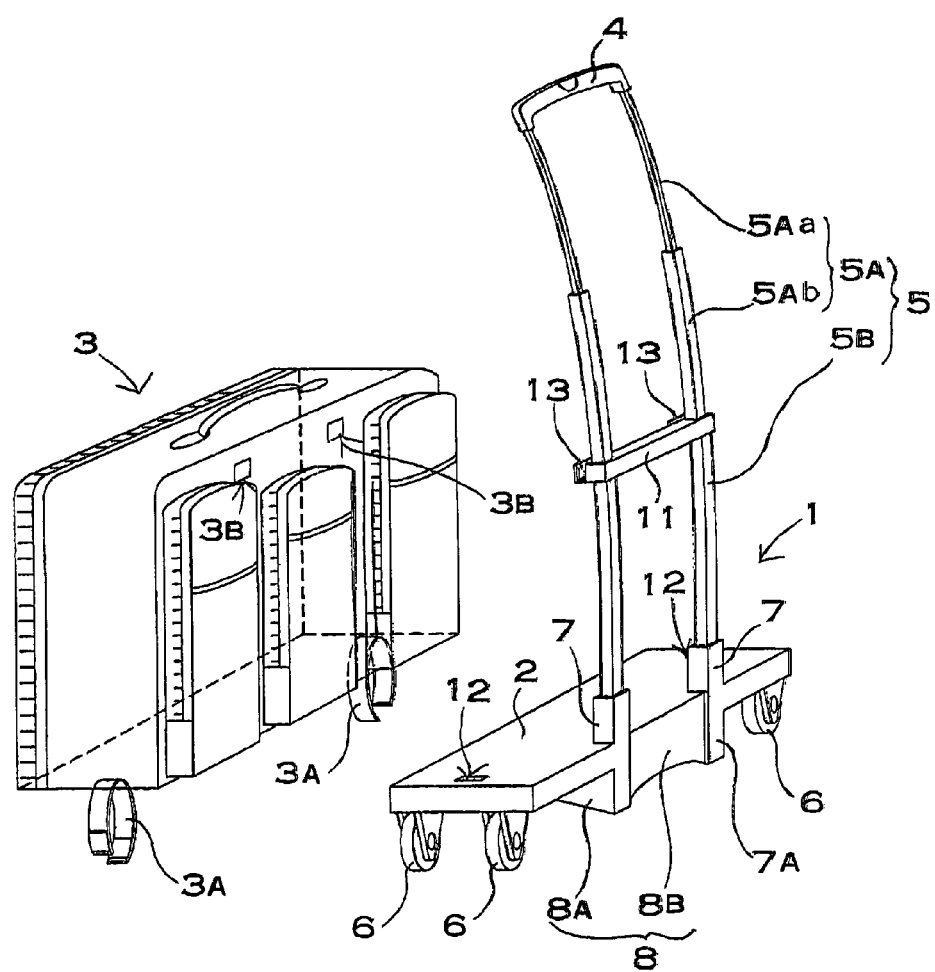
FIG. 7 is an exploded perspective view of the bag with caster wheels shown in FIG. 6.
Figure 8:
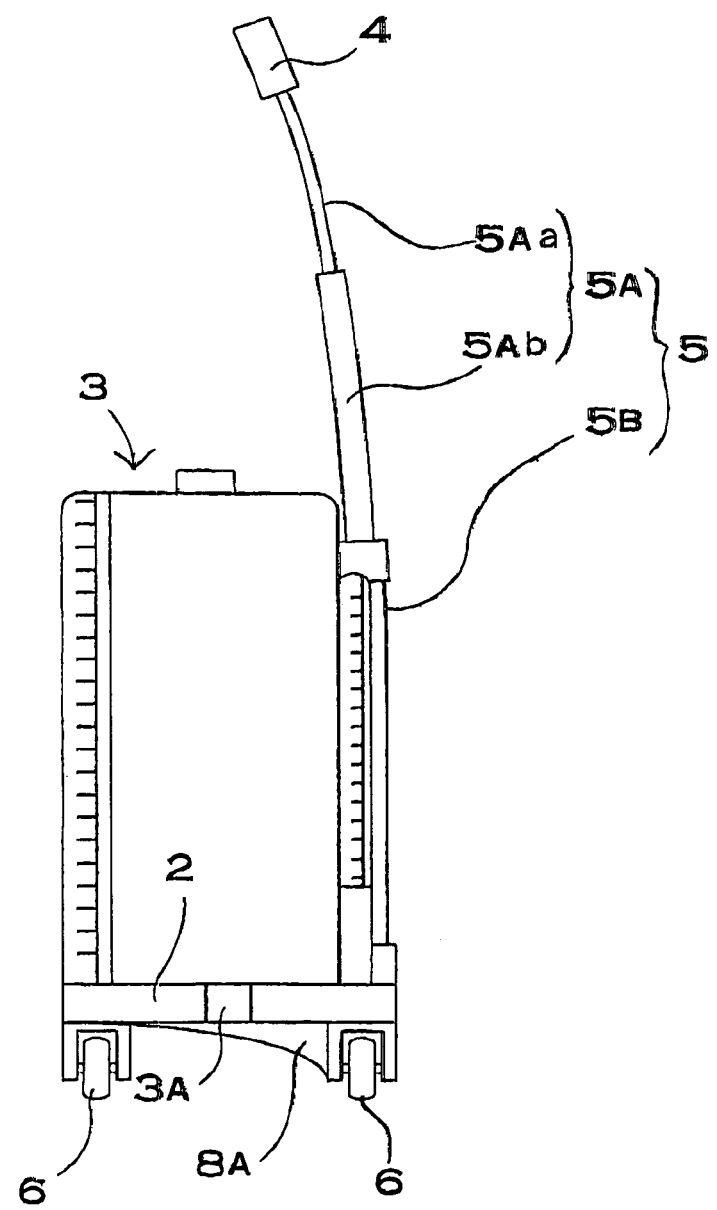
FIG. 8 is a front view of the bag with caster wheels as shown in FIG. 6.

A bag with caster wheels shown in FIGS. 6 to 8 includes the base frame 1 provided with caster wheels 6 which are free to swivel in any direction, at four corner regions of a bottom surface thereof, and the main bag 3 mounted on this base frame 1. In the bag in the figures, the main bag 3 is detachably mounted on the base frame 1. This bag has a feature that the main bag 3 can be easily replaced. However, the main bag can also be undetachably fixed to the base frame.

The base frame 1 is manufactured by forming plastic. The base frame 1, as shown in FIG. 7 and FIGS. 9 to 11, includes the stand 2 provided with the cater wheels 6 at the four corner regions and mounting the main bag 3 thereon, the telescopic rods 5 which are fixed on one side of this stand 2 so as to elongate upward and stand on their own, and which can be freely extracted upward and has the grip 4 at upper ends thereof, and stoppers for stopping the telescopic rods 5 at an extension position and at a retraction position. The base frame 1 has the main bag 3 mounted at side surfaces of the telescopic rods 5 on the stand 2.

The stand 2 is rectangular in entire planar shape. The stand 2 has the telescopic rods 5 fixed in the middle of one of long sides of the rectangle. In the base frame 1 in the figures, there are provided supporting cylinders 7 into which the telescopic rods 5 are inserted to be joined, by being formed integrally with the plastic stand 2. In the base frame 1 in the figures, the two supporting cylinders 7 are provided on one side and the telescopic rods 5 are inserted into the respective supporting cylinders 7 to be joined. The supporting cylinders 7 are formed integrally with, and joined to the stand 2 in a position oriented vertically. The supporting cylinders 7 are located in the middle on one of the long sides of the stand 2, which is rectangular, and are arranged between the caster wheels 6 provided on both end edges of the stand 2. Furthermore, the supporting cylinders 7 are projected in a lower surface and an upper surface of the stand 2. The telescopic rods 5 are inserted into these supporting cylinders 7 by their long portions, which allows the telescopic rods 5 to be securely joined to the stand 2. However, the supporting cylinders can also employ a structure of being projected only in the lower surface of the stand, not projected in the upper surface. A projection height (d) of the supporting cylinders 7 in the lower surface is made lower than a height (h) of the caster wheels 6. This is because if the projection height (d) in the lower surface is higher than the height of the caster wheels 6, tips of the supporting cylinders 7 collide with a traveling road surface and the bag cannot be smoothly moved with the caster wheels 6. A difference between the lower surface projection height (d) of the supporting cylinders 7 and the height (h) of the caster wheels 6 is preferably 1 cm. However, the difference in height can be 0.5 to 5 cm, preferably 0.6 to 4 cm, and more preferably 0.6 to 3 cm. In the case of the bag traveling in a smooth road surface, the difference in height is made smaller, and the supporting cylinders 7 can be projected largely in the lower surface. In this bag, the telescopic rods 5 can be securely pined to the supporting cylinders 7 so that the telescopic rods 5 do not fall.

Figure 9:
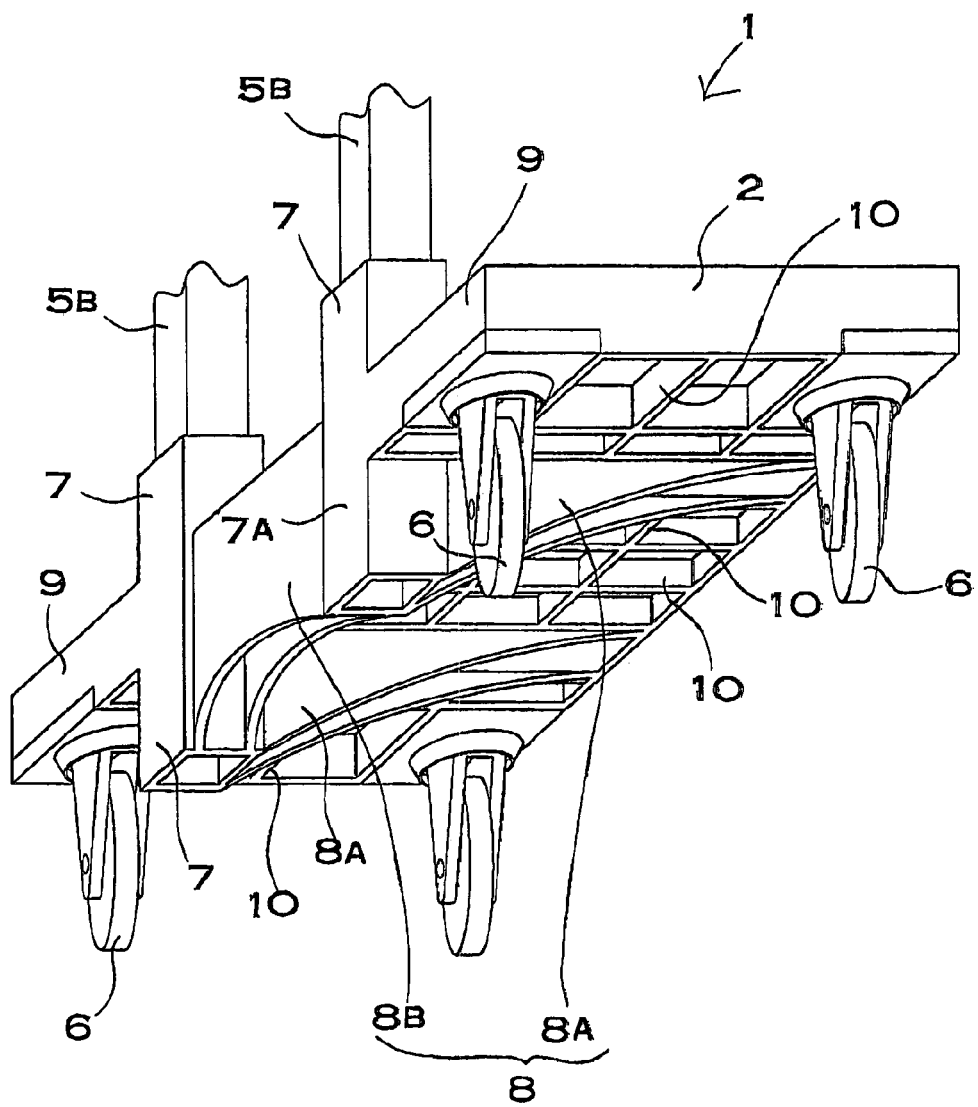
FIG. 9 is a bottom perspective view of a base frame of the bag with caster wheels shown in FIG. 7.
Figure 10:
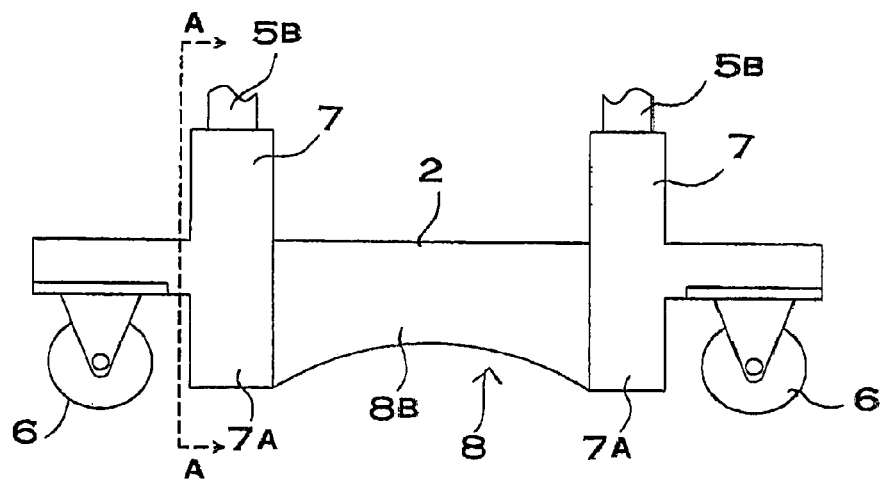
FIG. 10 is a side elevational view of the base frame of the bag with caster wheels shown in FIG. 7.
Figure 11:
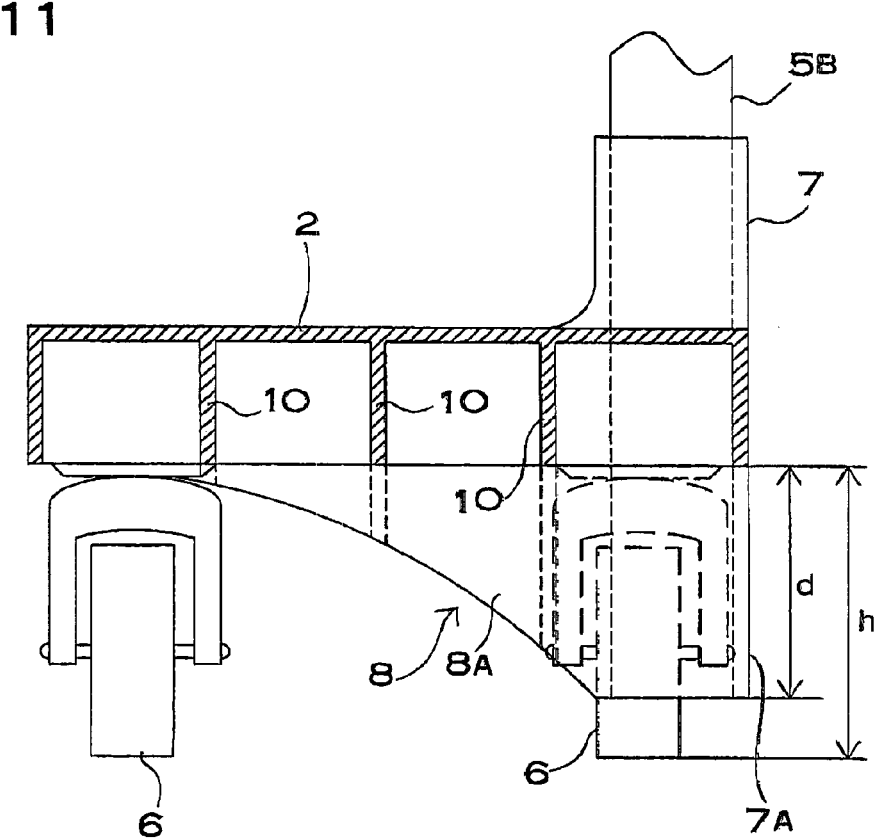
FIG. 11 is a sectional view along A-A line of the base frame shown in FIG. 10.

Furthermore, the supporting cylinders 7 are provided with the reinforcement walls 8 at the projected parts 7A in the lower surface by forming integrally, as shown in FIGS. 9 to 11. The reinforcement walls 8 are joined to the supporting cylinders 7 and the lower surface of the stand 2. The reinforcement walls 8 are provided by effectively utilizing space between the caster wheels which can be produced by providing the caster wheels 6 on the lower surface at the four corner regions of the stand 2. The stand 2 with the caster wheels 6 at the four corners is lifted by the caster wheels 6, which produces the space under the lower surface. The prior art bags do not utilize this space effectively. In the bag of the invention, the supporting cylinders 7 and the reinforcement walls 8 are provided by effectively utilizing this dead space between the caster wheels. Accordingly, by projecting the supporting cylinders 7 on the lower surface of the stand 2 and providing the reinforcement walls 8 formed integrally with these supporting cylinders 7 and the stand 2, the stand 2 does not need to be high. Furthermore, positions where the caster wheels 6 are fixed neither need to be changed, nor do the caster wheels themselves need to be modified to special ones.

The supporting cylinders 7 and the reinforcement walls 8 are arranged in the space produced between the caster wheels. In the base frame 1 in the figures, in addition to the lateral reinforcement walls 8A oriented in a lateral direction, the longitudinal reinforcement wall 8B oriented in a longitudinal direction is also provided. The lateral reinforcements 8A are provided in a position oriented in the lateral direction of the stand 2, that is, are provided in a position parallel to short sides of the rectangle. The longitudinal reinforcement wall 8B is provided between the two supporting cylinders 7 so as to join the two supporting cylinders 7. Namely, The longitudinal reinforcement wall 8B is joined to the supporting cylinders 7 at both end edges thereof and to the lower surface of the stand 2 at an upper edge thereof. In the base frame 1 with this structure, the supporting cylinders 7 are joined to the stand 2 with the lateral reinforcement walls 8A and the longitudinal reinforcement wall 8B. Accordingly, the supporting cylinders 7 are joined to the stand 2 so as not to fall in the lateral direction and in the longitudinal direction.

Furthermore, in a base frame shown in FIG. 9, two parallel rows of reinforcement walls 8 are provided for one supporting cylinder 7. The two rows of reinforcement walls 8 are provided so as to be joined to both side of the supporting cylinder 7. The base frame 1 in the figure, both of the lateral reinforcement wall 8A and the longitudinal reinforcement wall 8B are two parallel rows of ribs, respectively. While two rows of reinforcement walls 8 are provided in parallel in the figure, three rows or more of reinforcement walls can be provided in parallel. In this manner, the structure in which a plurality of rows of reinforcement walls parallel to each other are joined to the supporting cylinders 7 and the stand 2 allows the supporting cylinders 7 to be joined to the stand 2 with an extremely robust structure while keeping the base frame 1 light. However, the supporting cylinders can be joined to the stand with the reinforcements each in one row.

Furthermore, the base frame 1 in the figures, each of the lateral reinforcement walls 8A is shaped so that the height thereof is gradually reduced as it becomes farther from the supporting cylinder 7. Also, for the longitudinal reinforcement wall 8B, the height thereof, is reduced in the middle, that is, is reduced as it becomes farther from the supporting cylinders 7. The reinforcement walls 8 of this shape can effectively reinforce the supporting cylinders 7 so that the supporting cylinders 7 do not fall while reducing an entire area and, thus, a weight.

The base frame 1 with the stand 2, the supporting cylinders 7 and the reinforcement walls 8 is manufactured by integrally forming the whole from plastic. Accordingly, the supporting cylinders 7, the stand 2 and the reinforcement walls 8 are joined to each other in a process for forming the plastic, in this base frame 1, joining strength of the reinforcement walls 8, the stand 2, and the supporting cylinders 7 can be increased. However, in the bag of the invention, the reinforcement walls, the stand, and the supporting cylinders can also be separately formed from plastic and be fixed with a structure such as adhesion and screw cramp.

In the bag in figures, the telescopic rods 5 are each formed into a rectangular column, and thus the supporting cylinders 7 are each formed into a rectangular column. The telescopic rods 5 inserted into the supporting cylinders 7 are fixed to the supporting cylinders 7 with setscrews. However, the telescopic rods 5 can also be joined by being inserted into, bonded to, and fixing to the supporting cylinders 7 or with a fitting structure in which the telescopic rods 5 are not pulled out from the supporting cylinders 7. The above-described structures for joining the telescopic rods 5 to the stand 2 allow the telescopic rods 5 to be fixed to the stand 2 with an extremely robust structure.

Furthermore, in the stand 2, the upper surface is a flat surfaces and the lower surface is provided with reinforcement ribs 10 extending literally and longitudinally by forming plastic integrally. This stand 2 can have a robust structure by the reinforcement ribs 10 while the whole is made thin. Furthermore, the stand can be provided with through-holes penetrating the stand vertically, between the reinforcement ribs provided laterally and longitudinally, which will make the stand light.

Furthermore, the stand 2 in the figures is provided with protruded parts 9 which are protruded in directions increasing a width of the stand 2 on the side where the telescopic rods 5 are fixed, that is, on the right side in the figures. The caster wheels 6 are fixed to the parts where these protruded parts 9 are provided. In the stand 2 provided with the protruded parts 9, a distance between the caster wheels 6 fixed to both sides of the protruded parts 9 is increased, which makes the stand 2 more stable. If the lateral width is narrowed, the rectangular stand 2 easily falls in the lateral direction. However, by providing the protruded parts 9 to increase the distance between the caster wheels 6, the lateral stability can be enhanced. Since the caster wheels 6 are fixed at the four corner regions of the stand 2, the protruded parts 9 are provided at both end portions on the side where the extension rods 5 are joined. The stand 2 provided with the protruded parts 9 is 14 to 16 cm in width and 30 to 50 cm in length. However, it can also be 12 to 35 cm in width and 20 to 50 cm in length.

In the bag in the figures, the main bag 3 is mounted on the upper surface of the stand 2 and adjacent to the telescopic rods 5. The main bag 3 can be manufactured by sewing a flexible sheet. This bag is structured so as to mount the main bag 3 detachably. However, the main bag can also be fixed to the base frame undetachably. The base frame 1 in FIG. 7 is provided with joining holes 12 and joining pieces 13 so as to mount the main bag 3 detachably. The joining holes 12 are provided in the stand 2. In the stand 2 in FIG. 7, the joining holes 12 are provided so as to penetrate the stand 2 vertically. The joining holes 12 in FIG. 7 each are slit-formed. Joining bands 3A fixed to the main bag 3 are inserted into the silt-formed joining holes 12 respectively to join the main bag 3 to the base frame 1.

The joining pieces 13 are joined to the telescopic rods 5. In the bag in FIG. 7, the telescopic rods 5 are each composed of the guide cylinder 5B whose lower end is inserted into the supporting cylinder 7 of the stand 2 for joining and an extension rod 5A inserted into the guide cylinder 5B so as to be extended in two steps. The joining pieces 13 are provided in the joining rod 11 joining the guide cylinders 5B to each other at the upper ends. In the joining rod 11, the joining pieces 13 are provided by being integrally formed from plastic. The joining pieces 13 are each formed into a shape protected upward on a surface facing the main bag 3, and are inserted into the insertion parts 3B provided in the main bag 3 to join the main bag 3 without coming off. Each of the insertion parts 3B of the main bag 3 has a joining gap opened in a lower part thereof, into which the joining piece 13 is inserted to be joined to the insertion parts 3B. By inserting the joining pieces 13 into the insertion parts 3B provided in an upper part of the main bag 3, and by joining the joining bands 3A provided in a lower part of the main bag 3 to the base frame 1, the main bag 3 is joined without coming off. Joining the joining bands 3A to the base frame 1 prevents the main bag 3 from being moved up from the base frame 1. The joining pieces 13 extending upward further allows the main bag 3 which is not moved up any longer to be joined without coming off.

The above-described joining holes 12 and joining pieces 13 allow the main bag 3 to be detachably joined to the base frame 1 easily and securely without coming off in the following manner.

(1) The insertion parts 3B of the main bag 3 is hooked on the joining pieces 13.

(2) In this state, the joining bands 3A joined in the lower part of the main bag 3 are joined to the joining holes 12 provided in the stand 2 of the base frame 1. Each of the joining bands 3A is partially sewed on, or bonded to the main bag 3, and a detachably-joining device is provided at tips thereof. The detachably-joining device includes a button, button-like hook, hook, magic tape (registered trade mark), and the like.

The main bag 3 mounted on the base frame 1 can be detached from the base frame 1 by unloosening the joining bands 3A and moving up the main bag 3 to detach from the joining pieces 13 in a reverse manner to that of mounting. The above-described main bag 3 is joined to the base frame 1 in the lower part thereof, and to the joining pieces 13 in the upper part thereof, thereby easily being detached and securely mounted on the base frame 1. The main bag can also be mounted on the base frame in both of the upper part and the lower part by using the joining bands instead of the joining hooks.

As shown in FIGS. 6 to 8, the telescopic rods 5 are curved so that the grip 4 is moved from the one side where the telescopic rods 5 are fixed to the stand 2 toward the center, when the telescopic rods 5 are extended to pull up the grip 4. As shown in the figures, when the telescopic rods 5 are fixed on the right side of the stand 2, the center of the stand 2 means the center in the right-and-left direction. In the bag in the figures, since the telescopic rods 5 are fixed on the right side of the stand 2, the telescopic rods 5 are curved so that the grip 4 is moved from the right side of the stand 2 to the left side when the telescopic rods 5 are pulled up. In other words, the telescopic rods 5 are curved in a direction in which middle parts thereof are projected outward, and the pulled-up grip 4 is moved in a direction approaching the center from the side of the stand 2. In the state in which the telescopic rods 5 are pulled up, the grip 4 is not necessarily required to be located at the center of the stand 2. This is because even if the grip 4 is not located completely at the center, the bag can be moved forward without turning by pushing the grip 4. With regard to the position of the pulled-up grip 4, if one end surface of the stand 2 where the telescopic rods 5 are fixed is defined as a reference 0% and the other end surface on the opposite side is defined as 100% in the figures, the pulled-up grip 4 is located, for example, at 15 to 80%, preferably at 20 to 60%, and more preferably at 20 to 50%.

Figure 12:
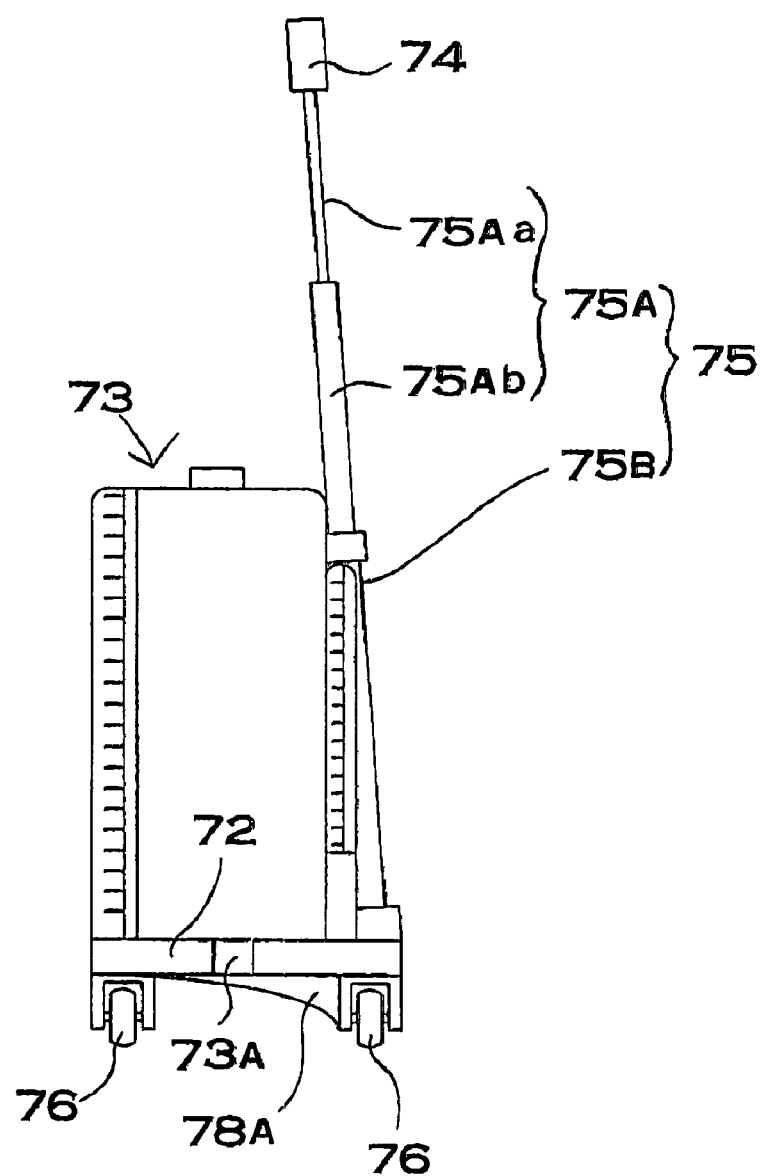
FIG. 12 is a front view of a bag with caster wheels according to another embodiment of the invention.

Furthermore, in a bag in FIG. 12, the telescopic rods 75 are fixed to the stand 72 inclinedly so that the grip 74 is moved from one side where the telescopic rods 75 are fixed to the stand 72 toward the center when telescopic rods 75 are extended and the grip 74 is pulled up. In the bag in FIG. 12, since the telescopic rods 75 are fixed on the right side of the stand 72, the telescopic rods 75 are inclined so that the grip 74 is moved from the right side of the stand 72 to the left side when the telescopic rods 75 are pulled up. In the inclined telescopic rods 75, as in the curved telescopic rods 5, the grip 74 is not necessarily required to be located at the center of the stand 72 in the pulled-up state. This is because even if the grip 74 is not located completely at the center, the bag can be moved forward without turning by pushing the grip 74.

In this figure, reference letter 73 denotes a main bag, 73A denotes a joining band, 75A denotes an extension rod, 75Aa denotes an extension rod in upper step, and 75Ab denotes an extension rod in lower step, and 75B denotes a guide cylinder, 76 denotes a caster wheel, and 78A denotes lateral reinforcement walls, respectively.

Furthermore, although not shown in the figure, in a bag, curved telescopic rods can also be fixed inclinedly on one side of a stand, so that a grip can be pulled up and moved from the one side of the stand toward the center. In this bag, a curvature radius of the curved telescopic rods is set to a large value and an inclination angle is nearly 90 degrees, which allows the grip to approach the center of the stand when pulled up. This is because both of the inclination and the curvature can make the pulled-up grip move from the side of the stand to the center.

Figure 13:
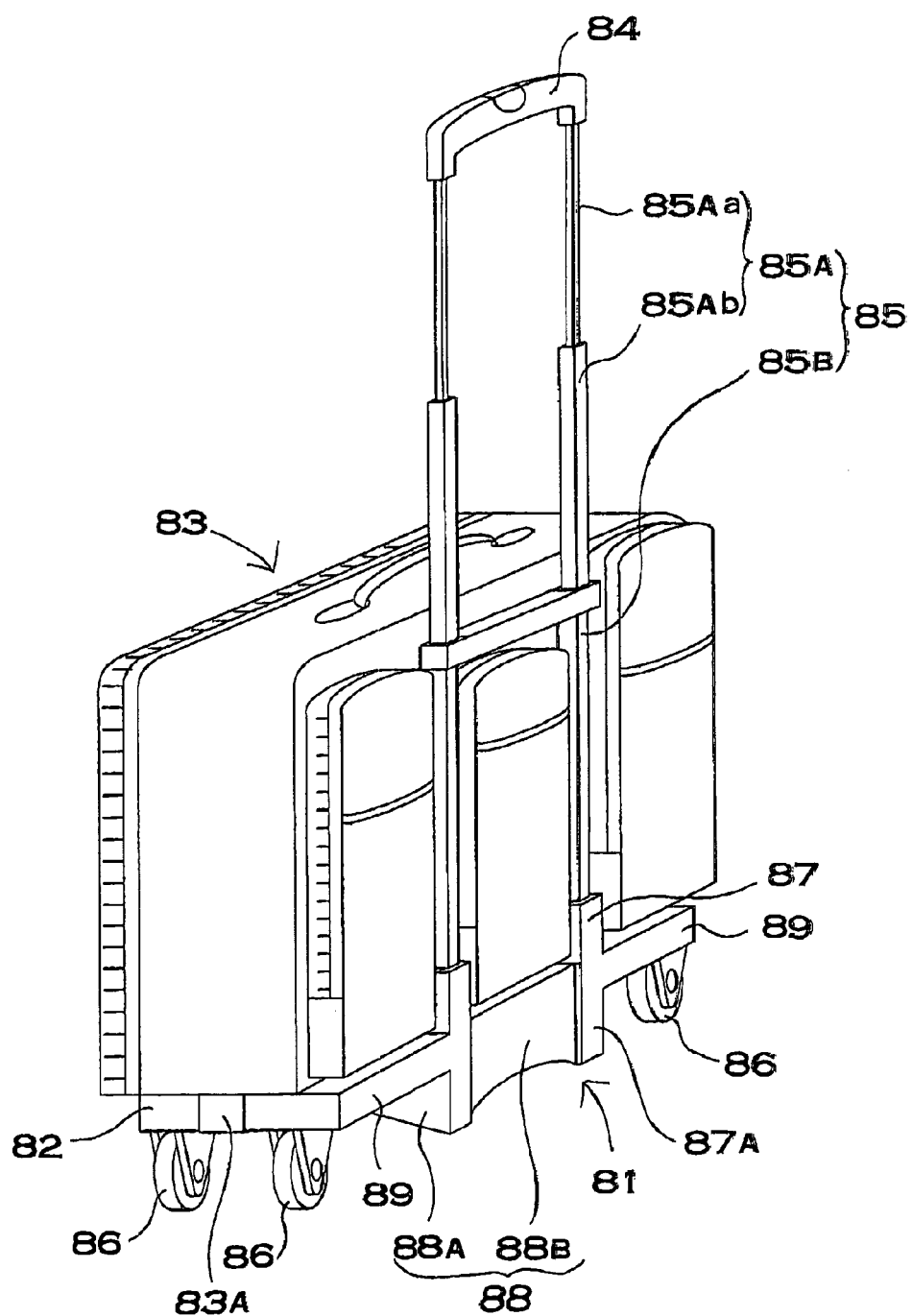
FIG. 13 is a perspective view of a bag with caster wheels according to another embodiment of the invention.

Still furthermore, in a bag of the invention, as shown in FIG. 13, straight telescopic rods 85 can be fixed vertically on one side of a stand 82.

In the bag of the above-described embodiment, the two telescopic rods 85 are fixed in the middle on one side of the stand 82. In this manner, the structure in which the telescopic rods 85 are arranged on one side of the stand 82 has a feature that a main bag 83 can be arranged on an almost entire upper surface of the stand 82, so that a bottom surface of the main bag 83 at which the main bag 83 is mounted on the stand 82 can be widened. However, the bag of the invention does not specify the structure in which the telescopic rods are arranged on one side of the stand. The telescopic rods can also be arranged between both sides of the stand.

In this figure, reference letter 81 denotes a base frame, 83A denotes a joining band, 84 denotes a grip, 85A denotes an extension rod, 85Aa denotes an extension rod in upper step, 85Ab denotes an extension rod in lower step, 85B denotes a guide cylinder, 86 denotes a caster wheel, 87 denotes a supporting cylinder, 87A denotes a projected part, 88 denotes a reinforcement wall, 88A denotes lateral reinforcement wall, 88B denotes longitudinal reinforcement wall, and 89 denotes a protruded part, respectively.

Figure 14:
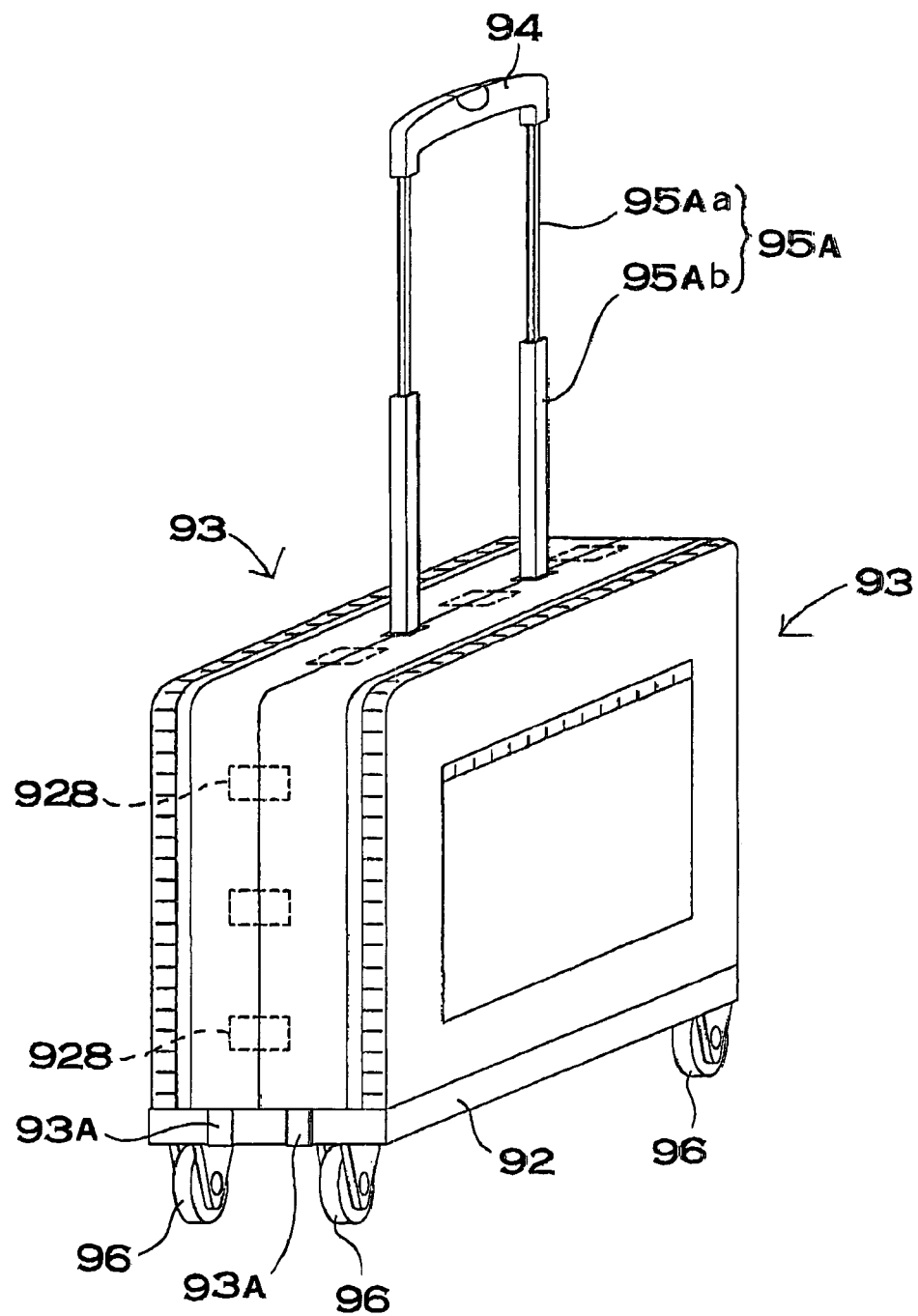
FIG. 14 is a perspective view of a bag with caster wheels according to another embodiment of the invention.
Figure 15:
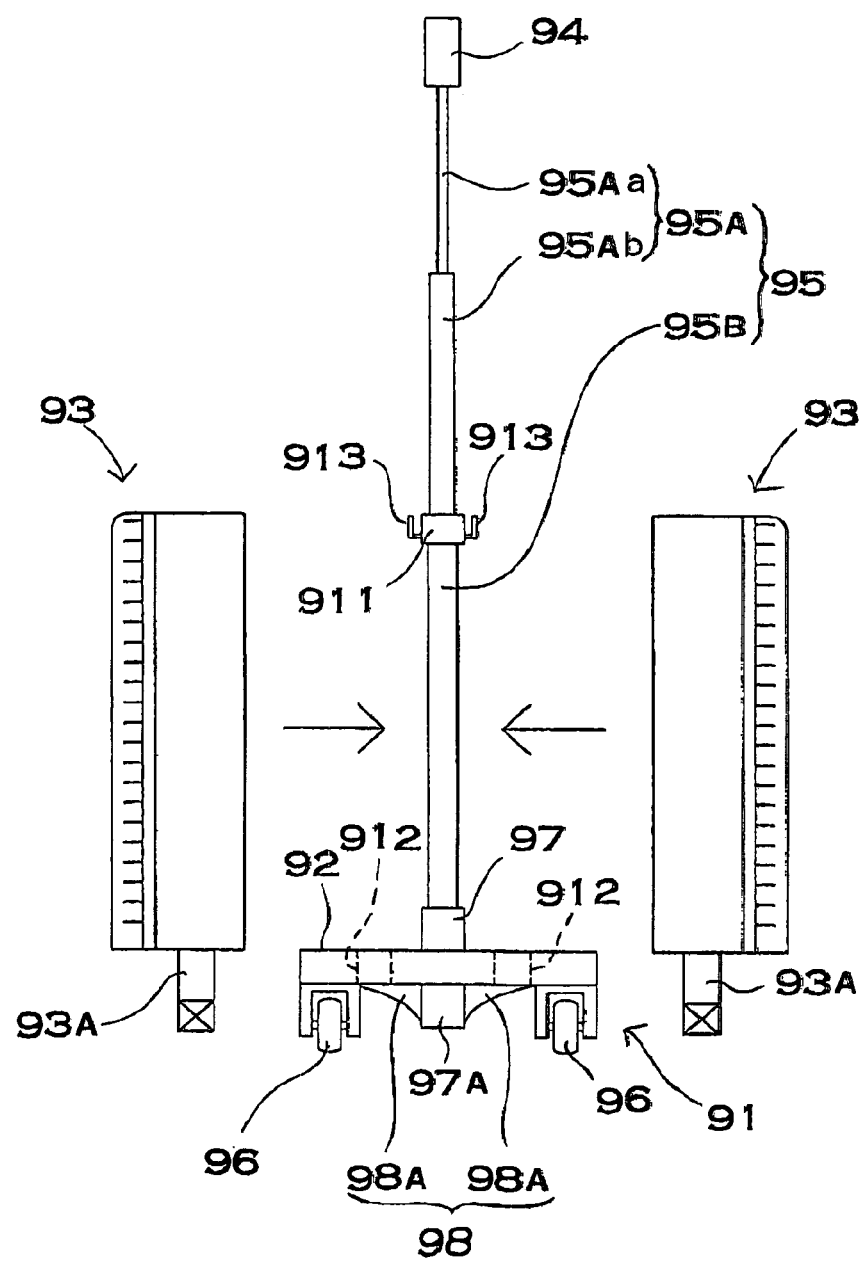
FIG. 15 is an exploded front view of the bag with caster wheels shown in FIG. 14.

In a base frame 91 of a bag shown in FIGS. 14 and 15, telescopic rods 95 are fixed between both sides of a stand 92 and between caster wheels 96 on both end portions. In the bag in the figures, the telescopic rods 95 are fixed at the center in the right-and-left direction of the stand 92, and a pair of main bags 93 is mounted adjacent to both sides of the telescopic rods 95. In this manner, the telescopic rods 95 arranged at the center of the stand 92 have a feature that a grip 94 can be arranged at the center of the stand 92, with a structure enabling linear extension and retraction in a vertical direction. However, the telescopic rods can also be displaced from the center of the stand toward one side to be arranged. The telescopic rods displaced toward one side of the stand to be arranged are curved as described above, or in a position inclined toward the center of the stand, so that the grip can be arranged at the center of the stand with the telescopic rods extended.

In the base frame 91 shown in FIGS. 14 and 15, supporting cylinders 97 are provided at the center of the stand 92 in order to hold the telescopic rods 95 in a position of standing on their own. Each of these supporting cylinders 97 also has a projected part 97A projected in a lower surface of the stand 92, and a projection height thereof, is made lower than a height of the caster wheels. Furthermore, in the supporting cylinders 97, reinforcement walls 98 are provided in the projected parts 97A in the lower surface by being formed integrally. For the reinforcement walls 98 in FIG. 15, lateral reinforcement walls 98A oriented in the lateral direction are provided on both sides of each of the projected parts 97A. Each of the lateral reinforcement walls 98A is shaped so that the height thereof is gradually reduced as it becomes farther from the supporting cylinder 97. Although not shown, the base frame has a longitudinal reinforcement wall oriented in the longitudinal direction. This longitudinal reinforcement wall is provided so as to join the two supporting cylinders. That is, the longitudinal reinforcement wall is joined to the supporting cylinders at both end edges thereof and to the lower surface of the stand at an upper edge thereof. In the base frame 91 structured as described above, the supporting cylinders 97 are joined to the stand 92 with the lateral reinforcement walls 98A and the longitudinal reinforcement wall. Accordingly, the supporting cylinders 97 are joined to the stand 92 so as not to fall in the lateral direction and in the longitudinal direction. Furthermore, longitudinal reinforcement walls can also be provided outside of the supporting cylinders extensively in the longitudinal direction. This is because the supporting cylinders are provided at the center of the stand and thus, the caster wheels at both end portions do not hinder. The longitudinal reinforcement walls outside of the supporting cylinders are shaped so that a height thereof, is gradually reduced as they become farther from the supporting cylinders, Furthermore, in the bag in the figures, the pair of main bags 93 is detachably mounted on the upper surface of the stand 92 and adjacent to both sides of the telescopic rods 95. In the bag in the figures, the pair of main bags 93 is mounted with the telescopic rods 95 sandwiched therebetween. The main bags 93 mounted on both sides of the telescopic nods 95 can also be joined with the joining structure described previously. Namely, the pair of the main bags 93 is joined to the base frame 91 without coming off, by inserting joining pieces 913 provided so as to be projected on both sides of a joining rod 911 into insertion parts (not shown) provided in upper parts of the main bags 93 and by joining bands 93A provided in lower parts of the main bags 93 to the joining holes 912 provided so as to be opened in the stand 92. Furthermore, the pair of main bags can also be joined at opposed surfaces to be joined to each other or their peripheral parts via detachably-joining members. For example, in the pair of main bags, the peripheral parts of the opposed surfaces are joined by a hook-and-loop fastener, button-like hooks or the like, of joined by a zipper along the peripheral parts of the opposed surfaces, or as indicated by chained lines in FIG. 14, a plurality of portions on outer peripheral surfaces are joined with joining devices 928 such as hook-and-loop fasteners and strings to prevent the joined portions of the pair of main bags 93 from being separated. This bag can be structured so that each of the main bags 93 is opened and closed with a wide opening area.

In FIGS. 14 and 15, reference letter 95A denotes an extension rod, 95Aa denotes an extension rod in upper step, and 95Ab denotes an extension rod in lower step, and 95B denotes a guide cylinder, respectively.

The telescopic rods 5 are stopped by the stoppers in a retraction state, in other words, in a state in which the grip 4 is pushed down as far as possible and is located on the top of, or above the main bag 3. With the telescopic rods 5 retracted and the grip 4 lowered as far as possible, a distance from the bottom surface of the caster wheels 6 to a top surface of the grip 4 is approximately 50 cm. However, with the telescopic rods 5 retracted and the grip 4 lowered as far as possible, the distance from the bottom of the caster wheels 6 to the top surface of the grip 4 can be preferably 30 to 80 cm, and more preferably 35 to 70 cm. To allow the grip 4 to be easily gripped, the main bag 3 is made lower than the grip 4 with the telescopic rods 5 retracted and the grip 4 lowered as far as possible. When the telescopic rods 5 are extended, that is, when the grip 4 is pulled up as far as possible, the telescopic rods 5 are stopped by the stoppers at positions where a height from the bottom surface of the caster wheels 6 to the center of the grip 4 is 60 to 100 cm, and preferably 65 to 85 cm.

The telescopic rods 5 are provided with the guide cylinders 5B fixed to the stand 2 so as to extend vertically, and the extension rods in two steps 5A which are inserted into these guide cylinders 5B in an extractable manner. The grip 4 is fixed to upper ends of the extension rods in upper step 5Aa. In each of the extension rods in two steps 5A, the extension rod in upper step 5Aa is made thinner than the extension rod in lower step 5Ab, and the extension rod in upper step 5Aa is inserted into the extension rod in lower step 5Ab in an extractable manner. Furthermore, in each of the telescopic rods 5, the extension rod in lower step 5Ab is made thinner than the guide cylinder 5B, and the extension rod in lower step 5Ab is inserted into the guide cylinder 5B in an extractable manner. The guide cylinders 5B and the extension rods 5A can be each formed into a metal cylinder having a different thickness. The guide cylinders and the extension rods can also be manufactured from plastic formed into a rectangular cylinder. While the extension rods in these figures are structured so as to be extended and retracted in two steps, they can also have a telescopic structure in one step, or in three steps or more.

In the bags shown in the above-described figures, the two telescopic rods 5 are fixed on one side of the stand 2 or between both sides thereof, and the grip 4 is joined to the upper ends of the two telescopic rods 5. Furthermore, in the bags shown in the above-described figures, the telescopic rods 5 are fixed so as to be located in the middle part on one side of the stand 2 or in the middle part between both sides. Namely, a distance between the two telescopic rods 5 is made shorter than a length of a long side of the stand 2 which is rectangular.

Furthermore, in the two telescopic rods 5, the upper ends of the guide cylinders 5B are joined by the joining rod 11. The lower ends of the guide cylinders 5B are put into the supporting cylinders 7 of the stand 2 to be fixed and the upper end portions are joined to each other via the joining rod 11. In this manner, with the structure in which the upper ends of the guide cylinders 5B are joined via the joining rod 11, the two telescopic rods 5 can be reinforced and stably stand on their own. There is provided an insertion gap 14 for inserting a hand between the joining rod 11 and the grip 4 lowered as far as possible as indicated by chained lines in FIG. 6. This is intended to easily grip the grip 4 lowered as far as possible. The entire grip 4 in the figure is formed into a U shape from plastic and folded parts on both ends thereof are joined to the extension rods 5A to produce the insertion gap 14.

Figure 16:
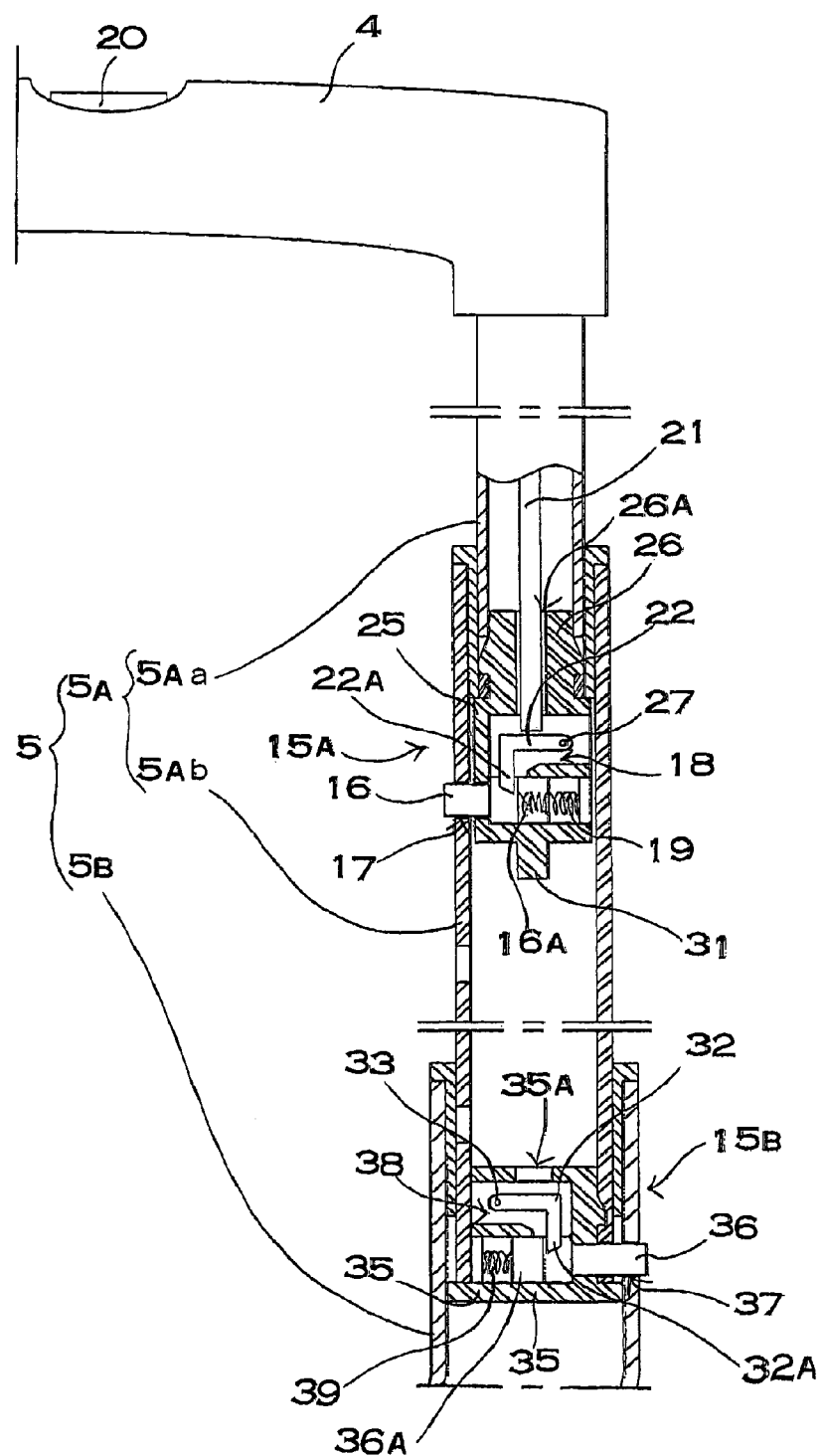
FIG. 16 is an enlarged sectional view of one example of stoppers of a telescopic rod.
Figure 17:
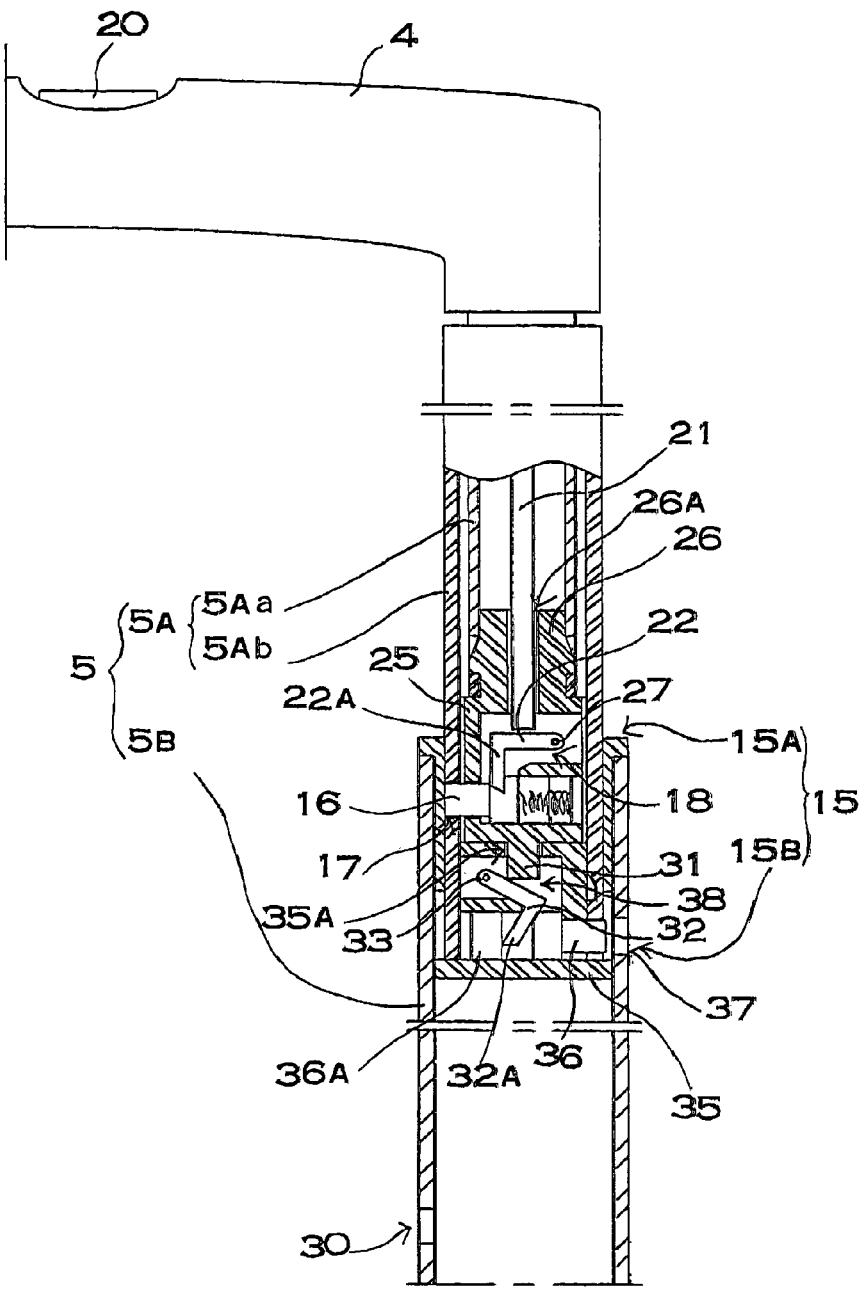
FIG. 17 is an enlarged sectional view showing a state in which a second stopper of the telescopic rod shown in FIG. 16 is released.
Figure 18:
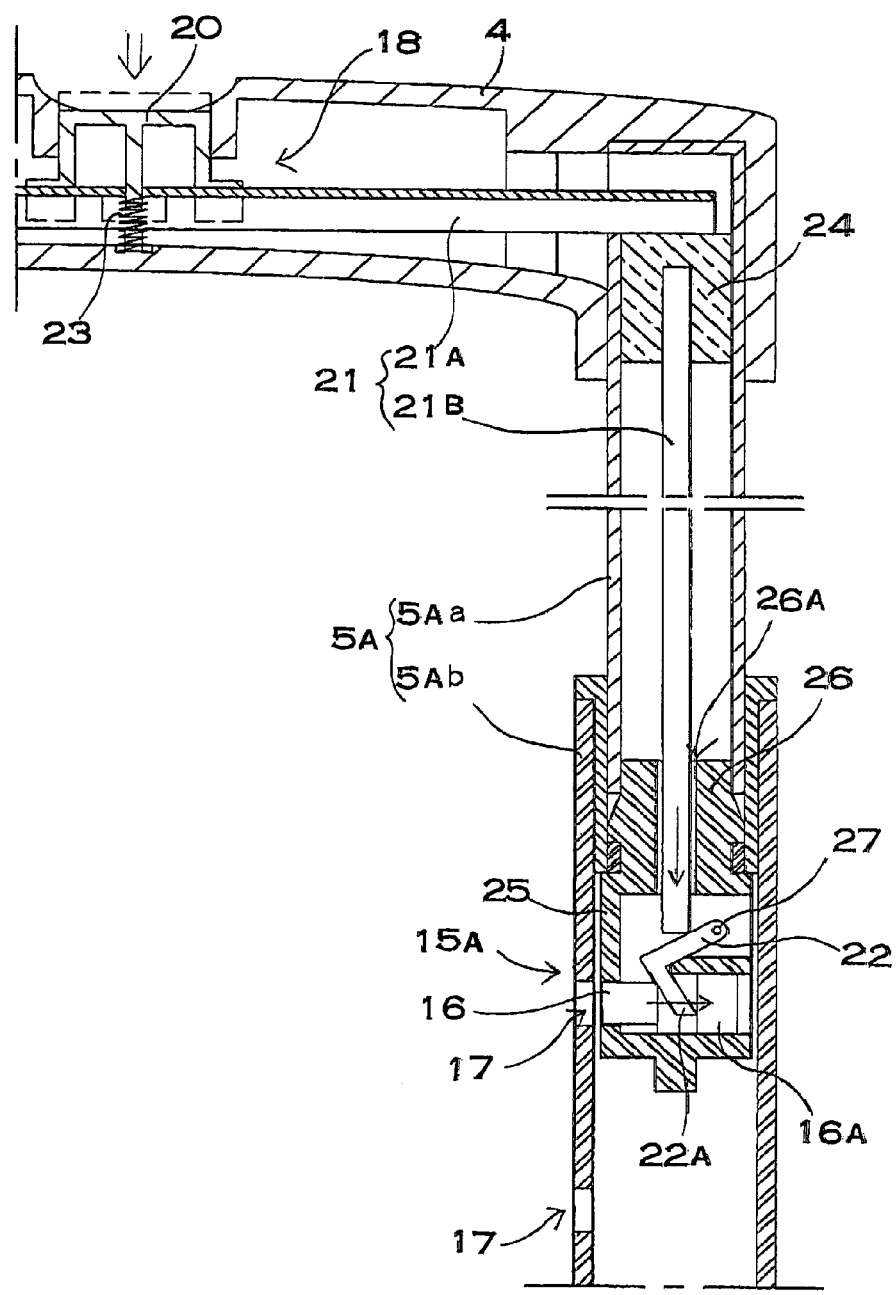
FIG. 18 is an enlarged sectional view showing a state in which a first stopper of the telescopic rod shown in FIG. 16 is released.

For the stopper, any mechanism capable of stopping the extension and retraction of the telescopic rods 5 can be utilized. One example of the stoppers is shown in FIGS. 16 to 18. Since the telescopic rods 5 shown in these figures each have a structure in which the extension rod in two steps 5A can be extended and retracted, the two stoppers 15 are provided in upper and lower parts. In each of telescopic rods 5, a first stopper 15A stops the extension and retraction of the extension rod in upper step 5Aa and the extension rod in lower step 5Ab. A second stopper 15B stops the extension of the extension rod in lower step 5Ab and the guide cylinder 5B. Furthermore, the retraction of the extension rod in lower step 5Ab and the guide cylinder 5B is stopped by the first stoppers 15A.

The first stopper 15A is disposed in a lower end portion of the extension rod in upper step 5Aa, and is provided with a projected pin 16 projected elastically toward the extension rod in lower step 5Ab, locking parts 17 provided in the extension rod in lower step 5Ab, into which the projected pin 16 is inserted, and a first release mechanism 18 which forcefully pulls out the projected pin 16 from the looking parts 17. The second stopper 15B is disposed in a lower end portion of the extension rod in lower step 5Ab, and is provided with a projected pin 36 projected elastically toward the guide cylinder 5B, a locking part 37 provided in the guide cylinder 5B, into which the projected pin 36 is inserted, and a second release mechanism 38 which forcefully pulls out the projected pin 36 from the locking part 37.

The projected pin 16 is disposed inside of the lower end portion of the extension rod in upper step 5Aa via an elastic member 19 so as to be elastically projected toward an outer peripheral direction of the extension rod 5A. The projected pin 36 is disposed inside of the lower end portion of the extension rod in lower step 5Ab via an elastic member 39 so as to be elastically projected toward the outer peripheral direction of the extension rod 5A. These projected pins 16 and 36 are elastically projected from the extension rod 5A by being pressed by the elastic members 19, 39. The projected pins 16, 36 are arranged in the extension rod 5A so as to be projected in the direction opposite to each other. In the telescopic rods 5 in the figures, the projected pin 16 is projected inward, that is, toward the opposed telescopic rod 5, and the projected pin 36 is projected outward, that is, in a direction opposite to the opposed telescopic rod 5.

The locking parts 17, 37 are through-holes or recessed parts into which the projected pins 16, 36 are inserted. In the extension rod in lower step 5Ab and the guide cylinder 5B shown in the figures, through-holes to insert the projected pins 16, 36 into are opened to form the locking parts 17, 37. In this manner, the structure in which the locking parts 17, 37 are through-holes has a feature that the projected pins 16, 36 inserted into the through-holes are projected while penetrating the through-holes, thereby stopping the telescopic rod 5 surely. This allows the telescopic rods 5 to be used extremely safely, particularly, when the telescopic rods 5 are used in place of sticks, in other words, when a user supports himself or herself in a position putting his or her weight on the grip 4. This is because the structure can effectively prevent the projected pins 16, 36 from unexpectedly coming off from the locking parts 17, 37, thereby pushing down the telescopic rods 5. Also, the structure has a feature that it can prevent the telescopic rods 5 from unexpectedly being pulled out when lifting the entire bag by holding the grip 4. In this manner, the stoppers 15 which can surely fix the position of the extension rods 5A have a feature that the telescopic rods can be used extremely safely when the grip 4 is in the raised position and in the lowered position. However, each of the locking parts can also be a recessed part into which the tip of the projected pin is inserted.

The locking parts 17 provided in the extension rod in lower step 5Ab, although not shown, are arranged at positions where the projected pin 16 is inserted in a state in which the extension rod in upper step 5Aa is pulled up as far as possible, in a state in which the extension rod in upper step 5Aa is pulled up to the middle, and in a state in which the extension rod 5Aa is lowered as far as possible, respectively. In the state in which the telescopic rod in upper step 5Aa is pulled up as far as possible, the projected pin 16 is inserted into the top locking part 17, in the state in which the telescopic rod in upper step 5Aa is lowered as far as possible, the projected pin 16 is inserted in the bottom locking part 17, and in the state in which the telescopic rod in upper step 5Aa is pulled up to the middle, the projected pin 16 is inserted into the intermediate locking part 17 to stop the extension and retraction of the extension rod in upper step 5Aa. In this manner, the telescopic rod 5 provided with the locking parts 17 in the middle of the extension rod in lower step 5Ab has a feature that the extension rod in upper step 5Aa can be extended and retracted in a plurality of steps. However, the extension rod in upper step is not necessarily required to be structured to be stopped in the middle position, but it can also be stopped only at the raised position and at the lowered position. Furthermore, for the telescopic rod in upper step, a plurality of locking parts in the middle of the extension rod in lower step can also be provided to stop the extension rod in upper step pulled up to the middle at a plurality of pulling-up positions. In this telescopic rod, an optical position can be selected by moving up and down the grip by degrees.

The locking part 37 provided in the guide cylinder 51 is arranged at a position where the projected pin 36 is inserted in a state in which the extension rod in lower step 5Ab is pulled up as far as possible. In the state in which the extension rod in lower step 5Ab is pulled up as far as possible, the projected pin 36 is inserted into the locking part 37 to stop the extension of the extension rod in lower step 5Ab. Furthermore, the guide cylinder 5B, as shown in FIG. 17, is provided with a locking part 30 to insert the projected pin 16 into in a state in which the extension rod in upper step 5Aa and the extension rod in lower step 5Ab are lowered as far as possible. The locking part 30 is provided at a position where the projected pin 16 penetrating the bottom locking part 17 of the extension rod in lower step 5Ab at the lowered position is to be inserted. Namely, in this telescopic rod 5, in a state in which the extension rod in upper step 5Ab and the extension rod in lower step 5Ab are lowered as far as possible, the projected pin 16 is inserted into the locking part 17 of the extension rod in lower step 5Ab and the locking part 30 on the inner side of the guide cylinder 5B to stop the telescopic rod 5 in a state in which the telescopic rod 5 is retracted as far as possible. In this manner, the projected pin 36 is inserted into the locking part 37 provided on the outer side of the guide cylinder 5B to stop the extension of the extension rod in lower step 5Ab, and the projected pin 16 is inserted into the locking part 30 on the inner side of the guide cylinder 5B to stop the retraction of the extension rod in lower step 5Ab.

The first release mechanism 18, as shown in FIG. 18, is provided with a push button 20 provided in the grip 4, a driving rod 21 which is joined to this push button 20 and is moved vertically by this push button 20, and a turning piece 22 which is pressed by a lower end of the driving rod 21 to turn in a direction in which the projected pin 16 is forcefully brought in.

The push button 20 is disposed at the central part of the upper surface of the grip 4 so as to move vertically. The push button 20 is joined to the lower surface of the grip 4 via an elastic body 23 and is elastically pushed out via this elastic body 23. This push button 20 is joined to the driving rod 21 at a lower surface thereof, and when the push button 20 is moved vertically with a finger, the driving rod 21 is driven vertically.

The driving rod 21 is disposed inside of the grip 4 and the extension rod in upper step 5Aa, and is driven vertically by the push button 20 to turn the turning piece 22. The driving rod 21 shown in FIG. 18 includes a horizontal rod 21A joined to the lower surface of the grip 4 and a vertical rod 21B inserted into the extension rod in upper step 5Aa. Each end of the horizontal rod 21A is located above an upper end of the vertical rod 21B, and when the horizontal rod 21A is pressed downward, the vertical rod 21B is pushed downward. The upper end of the vertical rod 21B is inserted into an insertion cap 24 moving vertically inside of the extension rod in upper step 5Aa so that the vertical rod 21B can precisely move vertically inside of the extension rod in upper step 5Aa. Nevertheless, each of the ends of the horizontal rod can also be joined to the upper end of the vertical rod. For example, the driving rod can be made of one rod folded into a U shape. Each lower end of the driving rod 21 extends up to the lower end of the extension rod in upper step 5Aa.

The turning piece 22 is disposed in the lower end portion of the extension rod in upper step 5Aa and when pressed by the lower end of the driving rod 21, it turns in the direction in which the projected pin 16 is forcefully brought in. The extension rod in upper step 5Aa shown in the figures has a guide cap 25 joined in its lower end, and inside of this guide cap 25, the turning piece 22 is mounted so as to turn in a vertical plane. In this guide cap 25, arm insertion hole 26A into which the driving rod 21 is inserted is opened in a joining cylinder part 26 which is inserted into the extension rod in upper step 5Aa so that the lower end portion of the driving rod 21 can be moved up and down precisely. The turning piece 22 is folded so as to have an L-shape in its entire, and is joined to the guide cap 25 via a rotating shaft 27 on both sides of one end thereof, and a pin 22A projected toward the projected pin 16 is provided at the other end. When the turning piece 22 is pressed by the driving rod 21 to turn, the tip thereof is brought into contact with projected parts 16A provided on both sides of the projected pin 16 so that the tuning piece 22 turns. The turning pin 22A presses and forcefully retracts the projected pan 16. When the press of the driving rod 21 is released, the projected pin 16 is not pressed by the pin 22A of the turning piece 22, and the turning piece 22 is pushed out elastically by the elastic member 19 and is turned to the original position.

In the above-described release mechanism 18, when the push button 20 is pressed, the driving rod 21 is pushed down, thereby turning the turning piece 22 disposed at the lower end of the driving rod 21. The turning piece 22 being turning moves the projected pin 16 in the direction in which the projected pin 16 is pulled out by the tip of the pin 22A and pulls out the projected pin 16 from the looking part 17. In this state, the first stopper 15A is released, thereby resulting in a state in which the extension rod in upper step 5Aa can move vertically inside of the extension rod in lower step 5Ab. The release of the push button 20 allows the projected pin 16 to be pressed by the elastic member 19 and be projected toward the extension rod in lower step 5Ab.

In the first stopper 15A, the push button 20 of the first release mechanism 18 provided in the grip 4 is pressed and the projected pin 16 is forcefully brought in to release the locked state. In this state, the extension rod in upper step 5Aa is pulled up or lowered. The extension rod in upper step 5Aa with the projected pin 16 brought in moves vertically inside of the extension rod in lower step 5Ab. When the push button 20 is released and then, the grip 4 is adjusted at a predetermined height, the projected pin 16 is guided into the locking part 17 to stop extracting and retracting the extension rod in upper step 5Aa and stop raising and lowering the grip 4.

The second release mechanism 38 is provided with an insertion rod 31 provided at the lower end of the extension rod in upper step 5Aa and a turning piece 32 which is pressed by the lower end of this insertion rod 31 to turn in a direction in which the projected pin 36 is forcefully brought in.

The insertion rod 31 is provided in a lower surface of the guide cap 25 fixed at the lower end of the extension rod in upper step 5Aa so as to be projected downward. This insertion rod 31 is inserted into an insertion hole 35A of a guide cap 35 fixed to the lower end portion of the extension rod in lower step 5Ab to press an upper surface of the turning piece 32 by a lower end thereof and turn the turning piece 32.

The turning piece 32 is disposed in the lower end portion of the extension rod in lower step 5Ab, and when pressed by the lower end of the insertion rod 31, it turns in the direction in which the projected pin 36 is forcefully brought in. The extension rod in lower step 5Ab shown in the figures has the guide cap 35 joined in the lower end thereof, and inside of this guide cap 35, the turning piece 32 is mounted so as to turn in a vertical plane. This guide cap 35 has an insertion hole 35A opened in an upper surface thereof so as to insert the insertion rod 31 therein. The turning piece 32 is folded so as to have an L-shape in its entire, and is joined to the guide cap 35 via a rotating shaft 33 at one end thereof, and a pin 32A projected toward the projected pin 36 is provided on both sides of the other end. When the turning piece 32 is pressed by the insertion rod 31 to turn, a tip of the pin 32A is brought into contact with projected parts 36A provided on both sides of the projected pin 36, so that the turning pin 32A being turning presses and forcefully retracts the projected pin 36. When the press of the insertion rod 31 is released, the projected pin 36 is not pressed by the pin 32A of the turning piece 32, and the turning piece 32 is pushed out elastically by the elastic member 39 and is turned to the original position.

In the above-described second release mechanism 38, when the extension rod in upper step 5Aa is pushed into the deepest part of the extension rod in lower step 5Ab, the insertion rod 31 is inserted into the insertion hale 35A of the guide cap 35, so that the turning piece 32 disposed at the lower end of the extension rod in lower step 5Ab is turned. The turning piece 32 being turning moves the projected pin 36 by the tip of the pin 32A in the pulling-out direction to pull out the projected pin 36 from the locking part 37. In this state, the second stopper 15B is released, thereby resulting in a state in which the extension rod in lower step 5Ab can be moved vertically inside of the guide cylinder 5B. At this time, the projected pin 16 of the stopper in upper step 15A is inserted into the bottom locking part 17 of the extension rod in lower step 5Ab, so that the insertion rod 31 is kept in a state of being inserted into the insertion hole 35A of the guide cap 35. Therefore, the projected pin 36 is kept in a state of being moved by the turning piece 32 in the pulling-out direction. In this state, the extension rod in upper step 5Aa and the extension rod in lower step 5AB are joined in a retracted state. The extension rod in upper step 5Aa and the extension rod in lower step 5Ab are moved vertically inside of the guide cylinder 5B in an integrally joined state.

Furthermore, when the extension rod in upper step 5Aa and the extension rod in lower step 5Ab which are joined integrally are inserted into the guide cylinder 5B the deepest, the projected pin 116 of the first stopper 15A is inserted into the locking part 30 provided on the inner side of the guide cylinder 5B. In this state, the retraction of the telescopic rod 5 is stopped and the grip 4 is stopped in the state in which it is lowered as far as possible. When releasing this locking state between this projected pin 16 and the locking part 30, the push button 20 of the first release mechanism 18 is pressed to pull out the projected pin 16 from the locking part 30. In this state, the extension rod in lower step 5Ab can be moved vertically inside of the guide cylinder 5B.

Furthermore, when stopping the extraction of the extension rod in lower step 5Ab, the pushing button 20 of the first release mechanism 18 is pressed to forcefully bring in the projected pin 16 and release the first stopper 15A, thereby extracting the extension rod in upper step 5Aa from the extension rod in lower step 5Ab. At this time, the insertion rod 31 is pulled out from the insertion hole 35A of the guide cap 35, and then the projected pin 36 is projected by the elastic member 39. In this state, the extension rod in lower step 5Ab is extracted and the projected pin 36 is inserted into the locking part 37 provided at the upper end portion of the guide cylinder 5B to stop the extraction of the extension rod in lower step 5Ab.

The stoppers 15 with the above-described structure can stop the telescopic rods 5 in which the extension rods 5A are extended or retracted in two steps, at predetermined positions. However, the bag of the invention does not specify the above-described stopper mechanism. For the stopper, any mechanism that can stop the telescopic rods at predetermined positions can be employed.

As this invention may be embodied in several forms without departing from the spirit of the essential characteristics thereof, the above-described embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. This application is based on application No. 2004-228653 filed in Japan on Aug. 4, 2004, the content of which is incorporated hereinto by reference.

What is claimed is:

1. A bag with caster wheels comprising:
a base frame having caster wheels which are free to swivel in any direction, at four corner regions of a bottom surface thereof; and
a main bag mounted on this base frame,
the base frame comprising:
a stand provided with the caster wheels at the four corner regions thereof and mounting the main bag thereon;
telescopic rods which are joined on one side of this stand or between both sides in an upward-extending position so as to stand on their own and which can be freely extended upward and are provided with a grip at upper ends thereof; and
stoppers for stopping the telescopic rods at an extension position,
wherein the main bag is joined to the telescopic rods on a side surface thereof, and the stand has supporting cylinders into which the telescopic rods are inserted to be joined, these supporting cylinders being arranged between the caster wheels provided at the four corners of the stand and being projected in a lower surface of the stand so that a projection height is made lower than a height of the caster wheels, and further, reinforcement walls joined to the lower surface of the stand are joined to lower surface projection parts of the supporting cylinders so as to reinforce the supporting cylinders for joining the stand, and lower ends of the telescopic rods are joined to these supporting cylinders.

2. The bag with caster wheels according to claim 1, wherein the reinforcement walls are provided between the caster wheels and in a position oriented in a lateral direction of the stand, that is, in a direction perpendicular to a longitudinal direction.

3. The bag with caster wheels according to claim 1, wherein the reinforcement walls comprises a longitudinal reinforcement wall oriented in a longitudinal direction in addition to the lateral reinforcements oriented in the lateral direction of the stand, and the supporting cylinders are joined to the stand with the lateral reinforcement walls and the longitudinal reinforcement wall.

4. The bag with caster wheels according to claim 1, wherein in the base frame, each of the supporting cylinders is provided with two parallel rows of reinforcements.

5. The bag with caster wheels according to claim 4, wherein in the base frame, two rows of reinforcements are provided so as to be joined to both sides of the supporting cylinders.

6. The bag with caster wheels according to claim 4, wherein in the base frame, both of the lateral reinforcement walls and the longitudinal reinforcement wall are made of two parallel rows of ribs, respectively.

7. The bag with caster wheels according to claim 1, wherein in the stand, an upper surface thereof, is flat and in the lower surface, reinforcement ribs extending in the longitudinal and lateral directions are provided by integrally being formed from plastic.

8. The bag with caster wheels according to claim 1, wherein the telescopic rods are curved in a direction in which the grip is moved from one side toward the center of the stand when pulled up.

9. The bag with caster wheels according to claim 1, wherein telescopic rods are inclined in a direction in which a grip is moved from one side toward the center of a stand when pulled up.

10. The bag with caster wheels according to claim 1, wherein a height from bottom surfaces of the caster wheels to the grip is 60 to 100 cm with the telescopic rods extended and stopped by the stoppers.

11. The bag with caster wheels according to claim 1, wherein the main bag is detachably mounted on the base frame.

12. The bag with caster wheels according to claim 1, wherein the telescopic rods comprise guide cylinders fixed to the stand in a position in which the telescopic rods are oriented vertically, and extension rods inserted into these guide cylinders in an extractable manner, and the grip is fixed to upper ends of the extension rods.

13. The bag with caster wheels according to claim 1, wherein the base frame is provided with the two supporting cylinders on one side of the stand, the two telescopic rods are joined to the two supporting cylinders, and the grip is joined to upper ends of the two telescopic rods.

14. The bag with caster wheels according to claim 13, wherein the longitudinal reinforcement is provided between the two supporting cylinders, and the two supporting cylinders are joined to the stand with the longitudinal reinforcement.

15. The bag with caster wheels according to claim 13, wherein in the two telescopic rods, upper ends of the guide cylinders are joined to a joining rod.

16. The bag with caster wheels according to claim 15, wherein the joining rod has joining pieces projected upward on a surface opposed to the main bags and the main bag is provided with insertion parts into which the joining pieces are inserted to be joined to the joining rod, wherein the joining pieces are put into the insertion parts to join the main bag to the joining rod.

17. The bag with caster wheels according to claim 1, wherein the telescopic rods have the joining pieces projected upward on surfaces opposed to the main bag, and the main bag is provided with the insertion parts into which the joining pieces are inserted to be joined to the telescopic rods, wherein the joining pieces are put into the insertion parts to join the main bag to the telescopic rods.

18. The bag with caster wheels according to claim 1, wherein the base frame has the stand and the reinforcement walls integrally formed from plastic.

* * * * *